US007587223B2

(12) United States Patent
Ono

(10) Patent No.: US 7,587,223 B2
(45) Date of Patent: Sep. 8, 2009

(54) TERMINAL FOR MOBILE PHONE AND METHOD FOR CONTROLLING THE SYNCHRONISM OF TERMINAL FOR MOBILE PHONE

(75) Inventor: Hiroshi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 1314 days.

(21) Appl. No.: 10/902,626

(22) Filed: Jul. 30, 2004

(65) Prior Publication Data

US 2005/0037817 A1 Feb. 17, 2005

(30) Foreign Application Priority Data

Aug. 1, 2003 (JP) ............................ 2003-285169

(51) Int. Cl.
*H04M 1/00* (2006.01)
(52) U.S. Cl. .................. 455/556.1; 455/73; 455/267; 455/282; 455/24; 381/98; 381/103; 381/110
(58) Field of Classification Search ............. 455/556.1, 455/73, 267, 282, 24; 381/98, 103, 110
See application file for complete search history.

(56) References Cited

U.S. PATENT DOCUMENTS

| 5,609,508 A | 3/1997 | Wingate |
| 5,821,987 A | 10/1998 | Larson |
| 5,895,123 A * | 4/1999 | Fujii et al. ................. 386/96 |
| 6,275,537 B1 | 8/2001 | Lee |
| 6,356,309 B1 * | 3/2002 | Masaki et al. ............ 348/439.1 |

FOREIGN PATENT DOCUMENTS

| EP | 1 047 252 A2 | 10/2000 |
| JP | 2001007895 | 1/2001 |
| JP | 2002-118638 | 4/2002 |
| JP | 2003-44621 | 2/2003 |

OTHER PUBLICATIONS

European Search Report dated Nov. 22, 2004.

* cited by examiner

*Primary Examiner*—Tuan A Pham
(74) *Attorney, Agent, or Firm*—McGinn IP Law Group, PLLC

(57) ABSTRACT

In a mobile phone terminal, in which a sound, such as the audio, may be synchronized with a moving picture even in case a sound processor unit processing the sound, such as audio, is controlled by a controller differing from the controller controlling a moving picture processing unit processing the moving picture, there is provided a synchronization controller which calculates the transmission time of a signal transmitted between an audio processing CPU and a moving picture processing CPU, transmits an audio processing start signal, commanding the start of the audio processing, to the audio processing CPU through the moving picture processing CPU, and transmits, at a timing when the previously calculated transmission time has elapsed as from the transmission of the sound processing start signal, a moving picture processing start command signal, commanding the start of the moving picture processing, to the moving picture processing CPU.

24 Claims, 14 Drawing Sheets

FIG. 12

AUDIO PROCESSING BLOCK 33

MOVING PICTURE PROCESSING BLOCK 36

D10: ta1=CountAOut

D11 SYNCHRONIZATION REQUEST (ta1)

D12: tv1=CountVOut

D13 SYNCHRONIZATION RESPONSE (ta1, tv1)

D14: ta2=CountAOut

D15 SYNCHRONIZATION CONFIRM (ta2, tv1)

D18: tv2=CountVOut

D16: ESTIMATE TIME ERROR BETWEEN AUDIO PROCESSING BLOCK AND MOVING PICTURE BLOCK
$\Delta Tav = (ta2 - ta1)/2$

FIG. 13

AUDIO PROCESSING BLOCK 33

MOVING PICTURE PROCESSING BLOCK 36

D10: ta1=CountAOut

D11 SYNCHRONIZATION REQUEST (ta1)

D12: tv1=CountVOut

D13 SYNCHRONIZATION RESPONSE (ta1, tv1)

D14: ta2=CountAOut

D15 SYNCHRONIZATION CONFIRM (ta2, tv1)

D18: tv2=CountVOut

D16: ESTIMATE TIME ERROR BETWEEN AUDIO PROCESSING BLOCK AND MOVING PICTURE BLOCK
$\Delta Tav = (ta2-ta1)/2$ D17: ESTIMATE CountVOut OF MOVING PICTURE PROCESSING BLOCK CountVOut
=(CountAOut−ta2)
+tv1+(ta2−ta1)/2

TERMINAL FOR MOBILE PHONE AND METHOD FOR CONTROLLING THE SYNCHRONISM OF TERMINAL FOR MOBILE PHONE

FIELD OF THE INVENTION

This invention relates to a mobile phone terminal and a method for controlling the synchronism of sound, such as audio signal or the like, and a moving picture, even though a sound processing block for processing the sound, such as audio signal or the like, and a moving picture processing unit for processing the moving picture, are controlled by respective different controllers.

BACKGROUND OF THE INVENTION

There has so far been known a mobile phone terminal capable of processing the audio signal and moving picture (Patent Document 1 (JP Japanese Patent Kokai Publication No. JP-P2002-118638A)).

As the standards for moving picture processing, there are MPEG4-Visual, prescribed by ISO14496, and H.263, which is the TV telephone system. As the standard for audio processing, there are MPEG4-Audio and AMR (Adaptive Multi Rate) for the mobile phone. In the mobile phone, the moving picture processing and audio processing are used in the 3GPP (The 3rd generation Partnership Project) for a third generation.

Up to now, in a mobile phone terminal such as a cellar phone terminal capable of recording and reproducing the audio (e.g. speech signal) and moving picture, a moving picture processing unit responsible for moving picture processing and an audio processor responsible for audio processing are controlled by a common CPU (inclusive of DSP) which manage control so that the moving picture and the audio signal will be synchronized during recording and reproduction.

FIG. 14 is a block diagram showing an example of a typical mobile phone terminal capable of recording and reproducing the audio and moving picture.

Referring to FIG. 14, a conventional mobile phone terminal, capable of recording and reproducing the audio and moving picture, is now explained.

Referring to FIG. 14, a mobile phone terminal 101 includes a transmitting/receiving antenna 8, a wireless part for the mobile phone system 9, a system processor 10, an audio input unit 5, an audio output unit 6, a moving picture input unit 14, a moving picture output unit 15 and an audio moving picture processing block 102.

The transmitting/receiving antenna 8 transmits/receives wireless signals of a mobile telephone system. The wireless part for the mobile phone system 9 modulates/demodulates wireless signals of the mobile phone system. The audio input unit 5 is e.g., a microphone supplied with the sound, such as audio. The audio output unit 6 is e.g., a loudspeaker outputting the sound, such as audio. The moving picture input unit 14 is e.g., a camera supplied with a moving picture. The moving picture output unit 15 is e.g., a display outputting e.g., moving picture. The audio moving picture processing block 102 processes the audio (sound) and the moving picture.

The audio moving picture processing block 102 includes an audio processor 103, a moving picture processing unit 104 and a CPU 105 for processing the audio/moving picture.

The audio processor 103 performs the processing of the sound information expressing sound, such as audio. The moving picture processing unit 104 performs the processing of the moving picture information, indicating the moving picture. The CPU 105 for processing the audio/moving picture controls the operations of the audio processor 103 and the moving picture processing unit 104.

In the conventional mobile phone terminal, shown in FIG. 14, the CPU 105 for processing the audio/moving picture controls the audio processor 103 and the moving picture processing unit 104 to synchronize the audio and the moving picture with each other.

In the Patent Document 2 (Japanese Patent Kokai Publication No. JP-P2003-44621A), there is disclosed, in a mobile phone terminal in which a sole system CPU controls the moving picture processing and audio processing, a technique in which a timer for reproducing picture sequence data and a timer for reproducing audio sequence data are started simultaneously.

Meanwhile, the disclosure of the Patent Document 2 lacks in concrete techniques for simultaneously starting the timer for reproducing the picture sequence data and the timer for reproducing the audio sequence data.

[Patent Document 1]
Japanese Patent Kokai Publication No. JP-P2002-118638A

[Patent Document 2]
Japanese Patent Kokai Publication No. JP-P2003-44621A

SUMMARY OF THE DISCLOSURE

In the conventional mobile phone terminal, stated in the Patent Document 2, in which the sole CPU (including the DSP) controls the moving picture processing unit processing moving picture and the audio processor processing the audio, the CPU is loaded unduly.

If, with a view to overcoming the problem of unduly increasing the CPU load, the moving picture CPU (inclusive of the DSP), controlling the moving picture processing unit, may be provided discretely from the audio CPU (inclusive of the DSP), controlling the audio processor. In this case, since the moving picture processing unit is controlled by a CPU discrete from the CPU controlling the audio processor, the risk is high that the moving picture is not synchronized with the audio.

Among the factors which give rise to the possibility of the moving picture being not synchronized with the audio in case the moving picture processing unit is controlled by a CPU different from the CPU controlling the audio processor, there is the synchronization error between the moving picture processing and the audio processing, ascribable to the transmission time of the signal transmitted between the moving picture CPU and the audio CPU.

For example, when the moving picture CPU sends to the audio CPU a signal used for synchronizing the moving picture with the audio, the signal used for synchronizing the moving picture with the audio is sent to the audio CPU after lapse of a preset time as from the time the signal is output from the moving picture CPU.

Consequently, the timing the audio CPU receives the signal used for synchronizing the moving picture with the audio lags the timing the moving picture CPU has output the signal used for synchronizing the moving picture with the audio by a time equal to the signal transmission time. This timing delay accounts for non-synchronism between the moving picture and the audio.

Thus, even when the audio processing speed of the audio processor, controlled by the audio CPU, is equal to the moving picture processing speed of the moving picture processing unit, controlled by the audio CPU, there is produced a synchronization error between the moving picture processing and the audio processing, ascribable to the transmission time of the signal between the moving picture CPU and the audio CPU.

In case the audio processing speed of the audio processor, controlled by the audio CPU, differs from the moving picture processing speed of the moving picture processing unit, controlled by the audio CPU, there is produced the synchronization deviation ascribable to the difference between the audio processing speed and the moving picture processing speed, in addition to the synchronization deviation ascribable to transmission time of the signal between the moving picture CPU and the audio CPU.

The problem of the possibility of the moving picture not being synchronized with the audio is the possibility that persists when the moving picture processing unit is controlled by a CPU (including the DSP) different from the CPU (including the DSP) controlling the audio processor. This problem may be raised not only when the moving picture processing unit and the audio processor are arranged in one mobile phone terminal but also when only one of the moving picture processing unit and the audio processor is arranged within the mobile phone terminal, provided that the moving picture processing unit and the audio processor are controlled by different CPUs.

For example, in case an external audio processor, having a processing speed different from the processing speed of the moving picture processing unit owned by the mobile phone terminal, is connected to the mobile phone terminal, so that the moving picture and the audio will be processed by the mobile phone terminal and the external audio processor, respectively, the moving picture may not be synchronized with the audio.

On the other hand, in case an external moving picture processing unit, having a processing speed different from the processing speed of the audio processor owned by the mobile phone terminal, is connected to the mobile phone terminal, so that the audio and the moving picture will be processed by the mobile phone terminal and the external moving picture processing unit, respectively, the moving picture may not be synchronized with the audio.

In case the mobile phone terminal is connected to an external audio processor or to an external moving picture processing unit, over a wireless domain where real time transmission is not guaranteed, there is similarly presented a problem that the processing on the mobile phone terminal side is not synchronized with the processing on the external device side (external audio processor or the external moving picture processing unit).

That is, in case a peripheral, such as the external audio processor or the external moving picture processing unit, is connected to the mobile phone terminal, there is presented a problem that the audio and the moving picture are not synchronized with each other.

Accordingly, it is an object of the present invention to provide a mobile phone terminal, and a synchronism controlling method for a mobile phone terminal, in which, even when the sound processor unit processing the sound, such as the audio, and the movable picture processor, processing moving picture, are controlled by different controllers, it is possible to synchronize the sound, such as the audio, with the moving picture.

The above and other objects are attained by a mobile phone terminal, in accordance with one aspect of the present invention, for performing sound processing using a sound processing block including a sound processor unit for processing the sound information expressing sound and a sound processing controller for controlling the sound processing by the sound processor unit, which comprises a moving picture processing unit for processing the moving picture processing information expressing moving picture, a moving picture processing controller for controlling the moving picture processing by the moving picture processing unit, and a synchronization controller for performing transmission time calculating processing for calculating the transmission time of a signal transmitted between the sound processing block and the moving picture processing controller, then compensating the synchronization error between the moving picture processing and the sound processing, based on the transmission time, and for performing synchronization processing for synchronizing the moving picture processing by the moving picture processing unit with the sound processing by the sound processor unit.

In the above aspect of the present invention, in which the transmission time of a signal transferred between the sound processing block and the moving picture processing controller is calculated and, based on the so calculated transmission time, the synchronization error between the moving picture processing and the sound processing, ascribable to the transmission time of the signal transmitted between the moving picture processing block and the moving picture processing controller is compensated to synchronize the moving picture processing by the moving picture processing unit and the sound processor unit by the sound processor unit, it becomes possible to eliminate the deviation of synchronization between the moving picture and the audio produced due to the transmission time of the signal transmitted between the sound processing block and the moving picture processing controller. The result is that, even though the moving picture processing controller and the sound processing controller are different controllers, it becomes possible to eliminate the deviation of synchronization between the moving picture and the audio.

In another aspect of the present invention, there is also provided a mobile phone terminal further comprising a sound processing counter for indicating the state of progress of sound processing by the sound processor unit in terms of a count value, wherein the moving picture processing block further includes a moving picture processing counter for indicating the state of progress of the moving picture processing by the moving picture processing unit in terms of a count value, the synchronization controller acquiring a count value of the moving picture processing counter via the sound processing controller, calculating a count value of the moving picture processing counter at a desired timing, based on a count value of the moving picture processing counter acquired, a count value of the sound processing counter at the time of acquisition of the count value of the moving picture processing counter, a count value of the sound processing counter at the desired timing and on the transmission time as calculated by the transmission time calculating processing, and controlling the processing speed in the sound processor unit through the sound processing controller so that the difference between the count value of the moving picture processing counter as calculated, at the desired timing, and the count value of the sound processing counter at the desired timing, will become smaller, by way of performing the synchronization processing.

In the above aspect of the present invention, the moving picture and the sound may be synchronized with the audio based on the count value of the sound processing counter and the count value of the moving picture processing counter.

With the mobile phone terminal according to the invention, the synchronization controller intermittently executes the transmission time calculating processing and the synchronization processing.

In the above aspect of the present invention, in which the transmission time calculating processing and the synchronization processing are executed intermittently, the moving picture may be intermittently synchronized with the sound even in case the sound processing speed by the sound processor unit controlled by the sound processing controller differs from the moving picture processing speed by the moving picture processing unit controlled by the moving picture processing controller.

In still another aspect of the present invention, there is provided a mobile phone terminal in which the synchronization controller transmits a moving picture processing start signal, commanding the start of the moving picture processing, through the sound processing controller to the moving picture processing block, and transmits a moving picture processing start command signal, commanding the start of the sound processing, to the sound processing controller, at a timing when the transmission time as calculated by the transmission time calculating processing has elapsed, by way of performing the synchronization processing.

In the above aspect of the present invention, the sound processing start timing may be synchronized with the moving picture processing start timing.

The mobile phone terminal of the present invention preferably includes the sound processing block.

Preferably, the moving picture processing block of the mobile phone terminal further includes a moving picture processing signal output unit for sending out an output of the moving picture processing unit to outside. The moving picture processing signal output unit is connected wirelessly or over a cable to an outside moving picture outputting device.

Preferably, the moving picture processing block of the mobile phone terminal is contained in an external moving picture processing terminal and the sound processing controller is connected wirelessly or over a cable to the moving picture processing block.

The moving picture processing block of the mobile phone terminal is contained in an external moving picture processing terminal connectable via a mobile phone system to a plural number of the moving picture processing controllers. The synchronization controller controls the sound processing controller through the sound processing controller for synchronizing the sound processing with the moving picture processing.

In the above aspect of the present invention, the moving picture, synchronized with the sound, output from the external sound processing terminal, may be reproduced by plural mobile phone terminals.

In still another aspect of the present invention, the mobile phone terminal for performing moving picture processing using a moving picture processing block including a moving picture processing unit for processing the moving picture information expressing moving picture and a moving picture processing controller controlling the moving picture processing by the moving picture processing unit comprises a sound processor unit for processing the sound information expressing sound, a sound processing controller for controlling the sound processing by the sound processor unit, and a synchronization controller for performing transmission time calculating processing for calculating the transmission time of a signal between the moving picture processing block and the sound processing controller, then compensating the synchronization error between moving picture processing and the sound processing, based on the transmission time, and for performing synchronization processing for synchronizing the moving picture processing by the moving picture processing unit with the sound processing by the sound processor unit.

In the above aspect of the present invention, in which the transmission time of a signal transmitted between the sound processing block and the moving picture processing controller is calculated and, based on the so calculated transmission time, the synchronization error between the moving picture processing and the sound processing, ascribable to the transmission time of the signal transmitted between the moving picture processing block and the moving picture processing controller is compensated to synchronize the moving picture processing by the moving picture processing unit and the sound processor unit by the sound processor unit, it becomes possible to eliminate the deviation of synchronization between the moving picture and the audio produced due to the transmission time of the signal transmitted between the sound processing block and the moving picture processing controller. The result is that, even though the moving picture processing controller and the sound processing controller are different controllers, it becomes possible to eliminate the deviation of synchronization between the moving picture and the audio.

The mobile phone terminal of the present invention further comprises a sound processing counter for indicating the state of progress of sound processing by the sound processor unit in terms of a count value, in which the moving picture processing block further includes a moving picture processing counter for indicating the state of progress of the moving picture processing by the moving picture processing unit in terms of a count value, with the synchronization controller acquiring a count value of the moving picture processing counter via the sound processing controller, calculating a count value of the moving picture processing counter at a desired timing, based on a count value of the moving picture processing counter acquired, a count value of the sound processing counter at the time of acquisition of the count value of the moving picture processing counter, a count value of the sound processing counter at the desired timing and on the transmission time as calculated by the transmission time calculating processing, and controlling the processing speed in the sound processor unit through the sound processing controller so that the difference between the count value of the moving picture processing counter as calculated, at the desired timing, and the count value of the sound processing counter at the desired timing, will become smaller, by way of performing the synchronization processing.

In the above aspect of the present invention, the moving picture and the sound may be synchronized with the audio based on the count value of the sound processing counter and the count value of the moving picture processing counter.

With the mobile phone terminal according to the invention, the synchronization controller intermittently executes the transmission time calculating processing and the synchronization processing.

In the above aspect of the present invention, in which the transmission time calculating processing and the synchronization processing are executed intermittently, the moving picture may be intermittently synchronized with the sound even in case the sound processing speed by the sound processor unit controlled by the sound processing controller differs from the moving picture processing speed by the moving picture processing unit controlled by the moving picture processing controller.

In the mobile phone terminal according to the present invention, the synchronization controller transmits a moving picture processing start signal, commanding the start of the moving picture processing, through the sound processing controller to the moving picture processing block, and transmits a moving picture processing start command signal, commanding the start of the sound processing, to the sound processing controller, at a timing when the transmission time as calculated by the transmission time calculating processing has elapsed, by way of performing the synchronization processing.

In the above aspect of the present invention, the sound processing start timing may be synchronized with the moving picture processing start timing.

Additionally, the mobile phone terminal of the present invention preferably includes the moving picture processing timing.

In the mobile phone terminal of the present invention, the moving picture processing block preferably further includes a moving picture processing signal output unit for sending out an output of the moving picture processing unit to outside. The moving picture processing signal output unit is preferably connected to an outside display device wirelessly or over a cable.

In the mobile phone terminal of the present invention, the moving picture processing block preferably is included in the outside moving picture processing terminal. The sound processing controller is preferably connected wirelessly or over a cable to the moving picture processing block.

In another aspect, the present invention provides a mobile phone terminal in which the sound processing block is contained in an external sound processing terminal connectable via a mobile phone system to a plural number of the moving picture processing controllers, with the synchronization controller controlling the moving picture processing unit through the moving picture processing controllers for synchronizing the moving picture processing with the sound processing.

In the above aspect of the present invention, the sound synchronized with the moving picture output from the outside moving picture processing terminal may be reproduced by plural mobile phone terminals.

In still another aspect, the present invention provides a synchronism controlling method carried out by a mobile phone terminal configured for performing sound processing using a sound processing block including a sound processor unit for processing the sound information expressing sound and a sound processing controller controlling the sound processing by the moving picture processing unit, with the mobile phone terminal including a moving picture processing unit for processing the moving picture information expressing moving picture and a moving picture processing controller for controlling the moving picture processing by the moving picture processing unit. The synchronism controlling method comprises a transmission time calculating step of calculating the transmission time of a signal transmitted between the sound processing block and the moving picture processing controller, and a synchronization controlling step of compensating the synchronization error between the moving picture processing and the sound processing, based on the signal transmission time calculated in the transmission time calculating step for performing synchronization processing for synchronizing the moving picture processing by the moving picture processing unit with the sound processing by the sound processor unit.

In the above aspect of the present invention, it becomes possible to eliminate the deviation of synchronization between the moving picture and the audio produced due to the transmission time of the signal transmitted between the sound processing block and the moving picture processing controller. The result is that, even though the moving picture processing controller and the sound processing controller are different controllers, it becomes possible to eliminate the deviation of synchronization between the moving picture and the audio.

In the synchronism controlling method for a mobile phone terminal according to the present invention, the mobile phone terminal further comprises a sound processing counter for indicating the state of progress of moving picture processing by the moving picture processing unit in terms of a count value. The sound processing block further includes a sound processing counter for indicating the state of progress of the sound processing by the sound processor unit in terms of a count value. The synchronism controlling step acquires a count value of the sound processing counter via the moving picture processing controller, calculates a count value of the sound processing counter at a desired timing, based on a count value of the sound processing counter acquired, a count value of the moving picture processing counter at the time of acquisition of the count value of the sound processing counter, a count value of the moving picture processing counter at the desired timing, and on the transmission time, as calculated by the transmission time calculating processing, and controls the processing speed in the moving picture processing unit through the moving picture processing controller so that the difference between the count value of the sound processing counter at the desired timing and the count value of the moving picture processing counter at the desired timing will become smaller, by way of performing the synchronization processing.

In the above aspect of the present invention, the moving picture and the sound may be synchronized with the audio based on the count value of the sound processing counter and the count value of the moving picture processing counter.

In the synchronism controlling method for a mobile phone terminal, according to the present invention, the synchronization controller intermittently performs the transmission time calculating processing and the synchronization processing.

In the above aspect of the present invention, in which the transmission time calculating processing and the synchronization processing are executed intermittently, the moving picture may be intermittently synchronized with the sound even in case the sound processing speed by the sound processor unit controlled by the sound processing controller differs from the moving picture processing speed by the moving picture processing unit controlled by the moving picture processing controller.

In still another aspect, the present invention provides a synchronism controlling method for a mobile phone terminal in which the synchronization controller transmits a sound processing start signal, commands the start of the sound processing, through the moving picture processing controller to the sound processing block, and transmits a moving picture processing start command signal, commanding the start of the moving picture processing, to the moving picture processing controller, at a timing when the transmission time as calculated by the transmission time calculating processing has elapsed, as from the time of transmitting the sound processing start signal, by way of performing the synchronization processing.

In the above aspect of the present invention, the start timing of the sound processing may be synchronized with that of the moving picture processing.

In still another aspect of the present invention, there is provided a synchronism controlling method in which the moving picture processing is carried out using a moving picture processing block including a moving picture processing unit for processing the moving picture information expressing moving picture and a moving picture processing controller controlling the moving picture processing by the moving picture processing unit. The mobile phone terminal includes a sound processor unit for processing the sound information expressing sound and a sound processing controller for controlling the sound processing by the sound processor unit. The synchronism controlling method comprises a transmission time calculating step of calculating the transmission time of a signal transmitted between the moving picture processing block and the sound processing controller, and a synchronism controlling step of compensating the synchronization error between the moving picture processing by the moving picture processing unit and the sound processing by the sound processor unit, based on the signal transmission time calculated in the transmission time calculating step, by way of performing synchronization processing for synchronizing the moving picture processing by the moving picture processing unit with the sound processing by the sound processor unit.

In the above aspect of the present invention, it becomes possible to eliminate the deviation of synchronization between the moving picture and the audio produced due to the transmission time of the signal between the sound processing block and the moving picture processing controller. The result is that, even though the moving picture processing controller and the sound processing controller are respective different controllers, it becomes possible to eliminate the deviation of synchronization between the moving picture and the audio.

In still another aspect, the present invention provides a synchronism controlling method for a mobile phone terminal in which the mobile phone terminal further comprises a sound processing counter for indicating the state of progress of sound processing by the sound processor unit in terms of a count value. The moving picture processing block further includes a moving picture processing counter for indicating the state of progress of the moving picture processing by the moving picture processing unit in terms of a count value. The synchronism controlling step acquires a count value of the moving picture processing counter via the sound processing controller, calculates a count value of the moving picture processing counter at a desired timing, based on a count value of the moving picture processing counter acquired, a count value of the sound processing counter at the time of acquisition of the count value of the moving picture processing counter, a count value of the sound processing counter at the desired timing, and on the transmission time, as calculated by the transmission time calculating processing, and controls the processing speed in the sound processor unit through the sound processing controller so that the difference between the count value of the moving picture processing counter at the desired timing and the count value of the sound processing counter at the desired timing will become smaller, by way of performing the synchronization processing.

In the above aspect of the present invention, the moving picture and the sound may be synchronized with each other based on the count value of the sound processing counter and that of the moving picture processing counter.

In the synchronism controlling method for a mobile phone terminal according to the present invention, the synchronization controller intermittently performs the transmission time calculating processing and the synchronization processing.

In the above aspect of the present invention, in which the transmission time calculating step and the synchronism controlling step are carried out intermittently, the moving picture may be intermittently synchronized with the sound even in case the sound processing speed of the sound processor unit controlled by the sound processing controller differs from the moving picture processing speed of the moving picture processing unit controlled by the moving picture processing unit.

In the above-described synchronism controlling method for a mobile phone terminal according to the present invention, the synchronism controlling step transmits a moving picture processing start signal, commanding the start of the moving picture processing, through the sound processing controller to the sound processing block, and transmits a sound processing start command signal, commanding the start of the sound processing, to the sound processing controller, at a timing when the transmission time as calculated by the transmission time calculating step as from the transmission of the moving picture processing start signal has elapsed, by way of performing the synchronization processing.

In the above aspect of the present invention, the sound processing start timing may be synchronized with the moving picture processing start timing.

The present invention, described above, gives the following meritorious effects:

The first meritorious effect is that the sound and the moving picture may be synchronized with each other even in case the sound processing controller, controlling the sound processor unit, is discrete from the moving picture processing controller, thereby reducing the load on the respective controllers.

The second effect is that the sound and the moving picture may be synchronized with each other even in case the sound processing block is arranged outside the mobile phone terminal. Thus, by co-owning the sound processing block, arranged outside the mobile phone terminal, with other mobile phone terminal(s), moving picture may be reproduced simultaneously on plural mobile phone terminals, by using e.g., an acoustic system having a superior acoustic effect, or a remote loudspeaker, as the sound processing block.

The third effect is that the sound and the moving picture may be synchronized with each other even in case the moving picture processing block is arranged outside the mobile phone terminal. Thus, by co-owning the moving picture processing block, arranged outside the mobile phone terminal, with other mobile phone terminal(s), the sound may be reproduced simultaneously on plural mobile phone terminals, by displaying moving picture on a display screen as the moving picture processing block.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 12 is a sequence diagram for illustrating an example of a step S103 shown in FIG. 11.

FIG. 13 is a sequence diagram for illustrating an example of a step S109 shown in FIG. 11.

PREFERRED EMBODIMENTS OF THE INVENTION

An embodiment of the present invention is now described with reference to the drawings.

Figure 1:
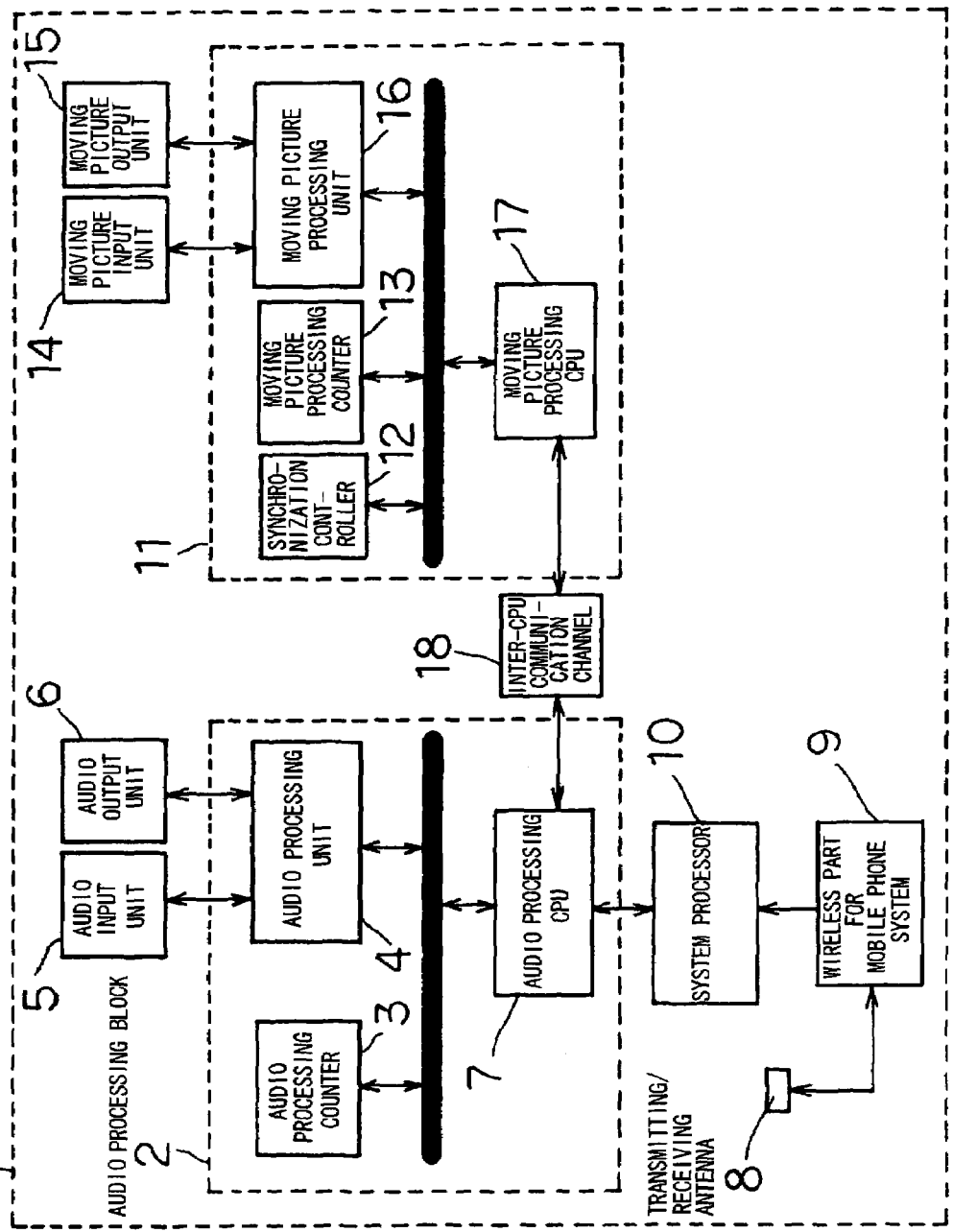
FIG. 1 is a block diagram showing a mobile phone terminal according to an embodiment of the present invention.

FIG. 1 is a block diagram illustrating a configuration of a terminal of a mobile phone according to an embodiment of the present invention.

Figure 14:
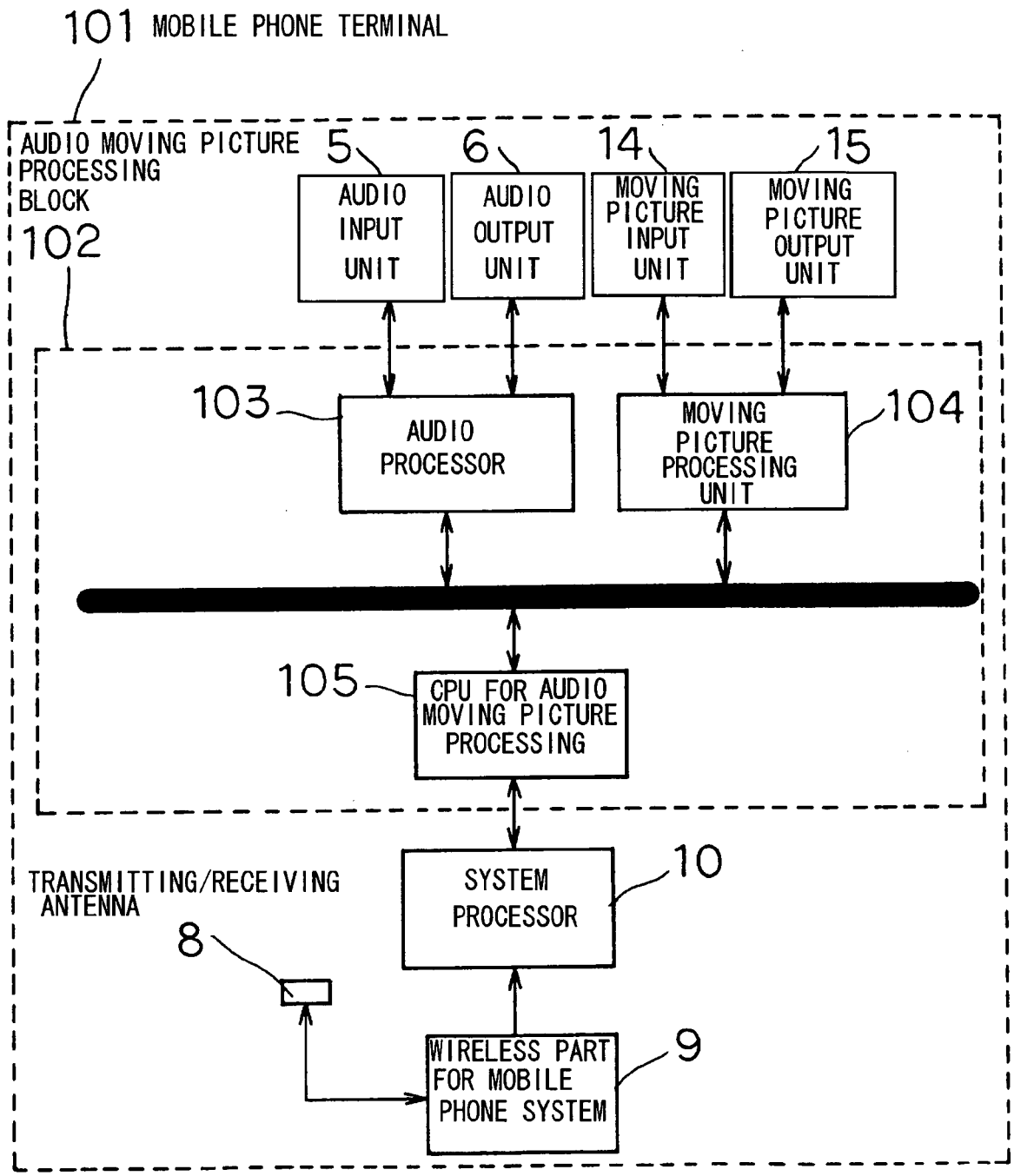
FIG. 14 is a block diagram showing a conventional mobile phone terminal.

Referring to FIG. 1, the mobile phone terminal 1 includes an audio processing block 2, an audio input unit 5, an audio output unit 6, a transmitting/receiving antenna 8, a wireless part for the mobile phone 9, a system processor 10, a moving picture processing block 11, a moving picture input unit 14, a moving picture output unit 15 and an inter-CPU communication channel 18. In FIG. 1, parts or components which are the same as those shown in FIG. 14 are indicated by the same reference numerals.

The mobile phone terminal 1 performs sound processing using the audio processing block 2.

The audio processing block 2, as a sound processing block, includes an audio processing counter 3, an audio processing unit 4 and an audio processing CPU 7.

The audio processing counter 3, as a sound processing counter, supervises the state of progress of audio processing. Specifically, the audio processing counter 3 indicates the degree of progress of the audio processing by the audio processing unit 4 by a count value, with the count speed varying with the audio processing speed. The count value by the audio processing counter 3 is termed a 'CountAOut value'.

The audio processing unit 4, as the sound processing unit, processes audio information as sound information expressing sound, such as audio or the like.

The audio processing CPU 7, as the audio processing controller, controls the audio processing by the audio processing unit 4 and the count operation by the audio processing counter 3.

The transmitting/receiving antenna 8 transmits/receives wireless signals of the mobile phone system. The wireless part for the mobile phone system 9 modulates/demodulates the wireless signal of the mobile phone system. The system processor 10 executes processing of mobile phone signal.

The moving picture processing block 11 includes a synchronization controller 12, a moving picture processing counter 13, a moving picture processing unit 16 and a moving picture processing CPU 17.

The moving picture processing counter 13 supervises the state of progress of moving picture processing. Specifically, the moving picture processing counter 13 specifies the degree of progress of the processing of moving picture by the moving picture processing unit 16 by a count value, with the count speed varying with the audio speed for moving picture. The count value by the moving picture processing counter 13 is termed a 'CountVOut value'.

The moving picture processing unit 16 processes the moving picture information expressing moving picture.

The moving picture processing CPU 17, as a moving picture processing controller, controls the count operation by the moving picture processing counter 13 and the moving picture processing by the moving picture processing unit 16.

The moving picture processing CPU 17 is connected to the audio processing CPU 7 through the inter-CPU communication channel 18.

The synchronization controller 12 performs transmission time calculating processing for calculating the transmission time of a signal which is transmitted between the sound processing block 2, specifically the audio processing CPU 7, and the moving picture processing CPU 17. Meanwhile, the technical matter of the synchronization controller 12 executing the transmission time calculating processing includes the technical matter of the synchronization controller 12 controlling the moving picture processing CPU 17 to allow the moving picture processing CPU 17 to execute the transmission time calculating processing.

The synchronization controller 12 performs the processing for synchronizing the moving picture processing by the moving picture processing unit 16 with the audio processing by the audio processing unit 4. Meanwhile, the technical matter of the synchronization controller 12 executing the synchronizing processing includes the technical matter of the synchronization controller 12 controlling the moving picture processing CPU 17 to allow the moving picture processing CPU 17 to execute the synchronizing processing.

An example of the synchronizing processing, carried out by the synchronization controller 12, is now described.

The synchronization controller 12 acquires the count value of the audio processing counter 3 through the moving picture processing CPU 17.

The synchronization controller 12 then calculates the count value of the audio processing counter 3, based on a count value of the audio processing counter 3 acquired, a count value of the moving picture processing counter 13 when the count value of the audio processing counter 3 has been acquired, a count value of the moving picture processing counter 13 at a desired timing, and the calculated transmission time.

The synchronization controller 12 then controls the processing speed of the moving picture processing unit 16, through the moving picture processing CPU 17, for decreasing the difference between the count value of the audio processing counter 3 and the count value of the moving picture processing counter 13 at the desired timing.

Another example of the synchronizing processing, carried out by the synchronization controller 12, is described below.

The synchronization controller 12 sends an audio processing start signal for commanding the start of audio processing (for example, a request for audio reproduction or a request for audio recording) through the moving picture processing CPU 17 to a sound processing block, specifically, to the audio processing CPU 7, while sending a moving picture processing start command signal for commanding the start of moving picture processing (for example, a moving picture reproduction start signal or a moving picture recording start signal), commanding the start of moving picture processing, at a timing when pre-calculated time has elapsed from the transmission of the audio processing start signal, to the moving picture processing CPU 17.

On receipt of the audio processing start signal, the audio processing CPU 7 causes the audio processing unit 4 to execute audio processing, corresponding to the so received audio processing start signal. On receipt of the moving picture processing start signal, the moving picture processing CPU 17 allows the moving picture processing unit 16 to execute the moving picture processing, responsive to the so received moving picture processing start signal.

Meanwhile, in the present embodiment, when the synchronization controller 12 controls the moving picture processing CPU 17 to execute the above synchronizing processing, the synchronization controller 12 and the moving picture processing CPU compose a synchronism control unit according to the present invention.

The operation of the mobile phone is hereinafter described.

Figure 2:
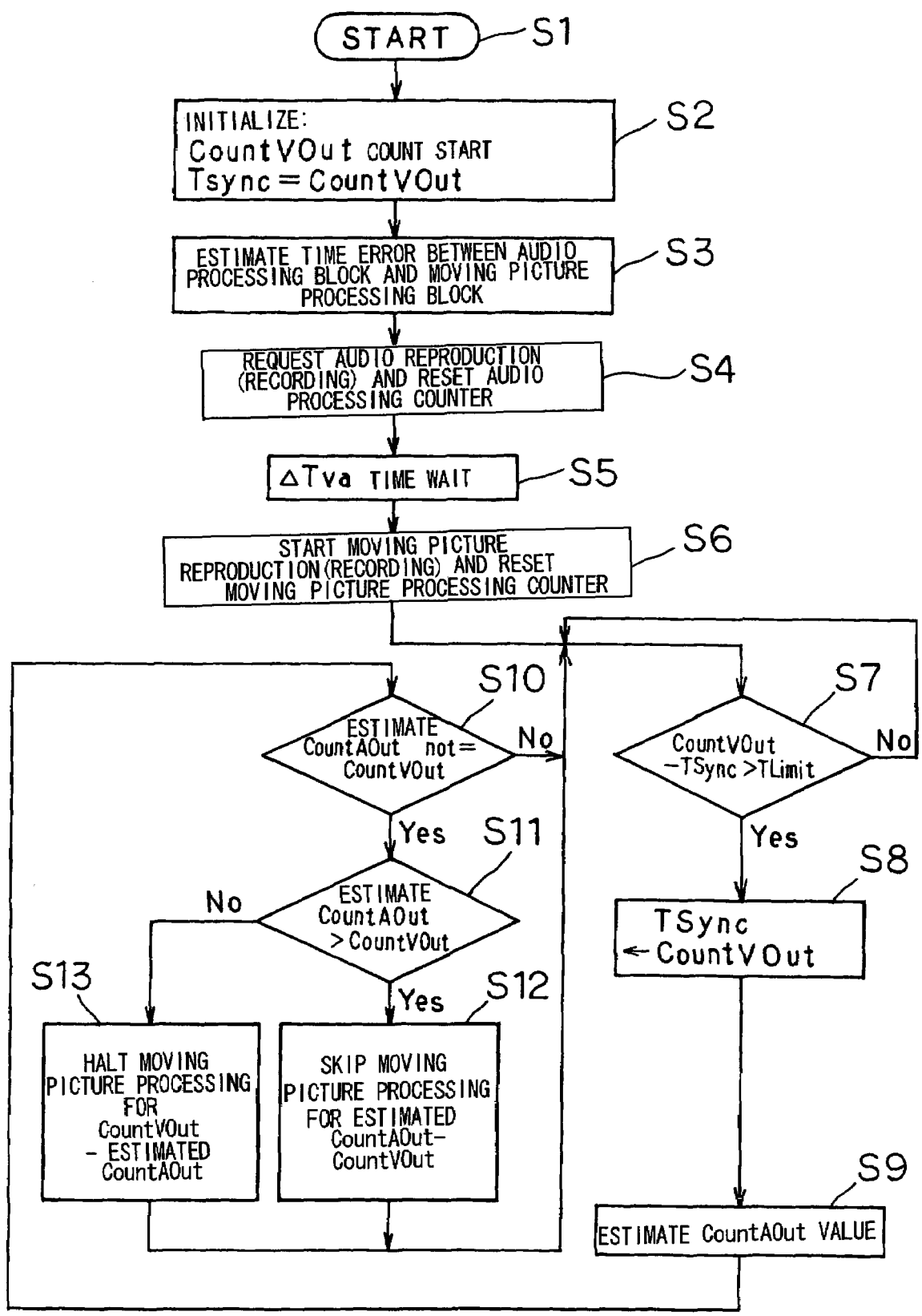
FIG. 2 is a flowchart for illustrating the operation of the mobile phone terminal shown in FIG. 1.

FIG. 2 is a flowchart for illustrating the operation of the mobile phone terminal 1 shown in FIG. 1. Referring to FIG. 2, the operation of the mobile phone terminal 1, shown in FIG. 1, is now described.

For example, when a user manipulates a key, not shown, to command the reproduction or the recording of the moving picture with audio (step S1), the synchronization controller 12 controls the moving picture processing CPU 17 to start the count of the moving picture processing counter 13 (CountVOut) of the moving picture processing counter 13, by way of a default operation. The synchronization controller 12 also controls the moving picture processing CPU 17 to substitute the count value (CountVOut value) of the moving picture processing counter 13 for a TSync value indicating the synchronizing processing start timing (step S2).

Meanwhile, the TSync value is stored in the moving picture processing CPU 17. Although the count operation by the moving picture processing counter 13 is started in the step S2, the moving picture processing is not carried out at this time point by the moving picture processing unit 16.

The synchronization controller 12 then calculates the transmission time of a signal, between the sound processing block 2 (specifically, the audio processing CPU 7) and the moving picture processing CPU 17 (estimated time error) (step S3).

Figure 3:
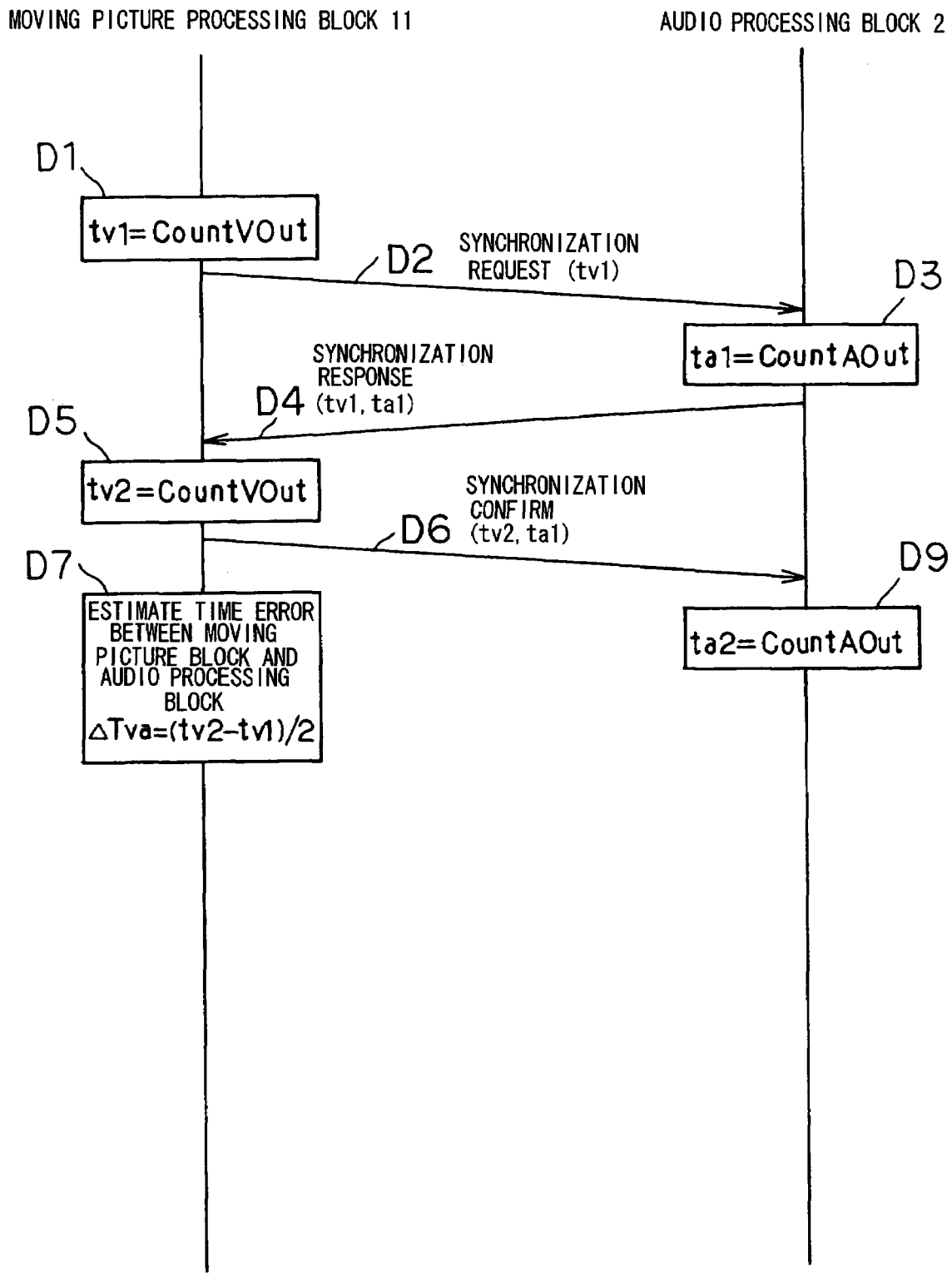
FIG. 3 is a sequence diagram for illustrating an example of a step S3 shown in FIG. 2.

FIG. 3 is a sequence diagram for illustrating the processing in the step S3 shown in FIG. 2.

Referring to FIG. 3, the processing for calculating the transmission time of the step S3 (time error estimation) is explained.

Under control by the synchronization controller 12, the moving picture processing CPU 17 in the moving picture processing block 11 substitutes the CountVOut value, as a count value of the moving picture processing counter 13, for a variable tv1 (step D1), and sends a synchronizing request to the audio processing block 2, specifically the audio processing CPU 7, substantially simultaneously as the step D1 (step D2). Meanwhile, the variable tv1 is attached, as an argument, to the synchronizing request, executed in the step D2.

The audio processing block 2, specifically the audio processing CPU 7, which has received the synchronizing request, executed in the step D2, substitutes the CountAOut value, as a count value of the audio processing counter 3, for a variable ta1 (step D3). Meanwhile, this step D3 may be omitted.

The audio processing block 2, specifically the audio processing CPU 7, which has received the synchronizing request, executed in the step D2, sends a synchronizing response to the moving picture processing block 11, specifically the moving picture processing CPU 17 (step D4). The variables tv1 and ta1 may be attached as arguments to the request, executed in the step D2. Meanwhile, in case the step D3 is omitted, only the variable tv1 may be attached as argument to the synchronizing request executed in the step D4.

The moving picture processing block 11, specifically the audio processing CPU 7, which has received the synchronizing request, executed in the step D4, substitutes the CountVOut value, as a count value of the moving picture processing counter 13, for a variable tv2, under control by the synchronization controller 12 (step D5). Substantially simultaneously as the step D5, synchronization confirmation is sent to the audio processing block 2, specifically the audio processing CPU 7 (step D6). At least the variable tv2 may be attached as an argument to the synchronization confirmation executed in the step D6.

The audio processing block 2, which has received the synchronization confirmation, executed in the step D6, substitutes the CountAOut value, as a count value of the audio processing counter 3, for a variable ta2 (step D9). Meanwhile, this step D9 may be omitted.

The moving picture processing block 11, specifically the moving picture processing CPU 17, estimates the communication time error between the moving picture processing block 11 and the audio processing block 2, under control by the synchronization controller 12.

In the present embodiment, the time since the signal transmission by the moving picture processing CPU 17 to the audio processing block 2, specifically the audio processing CPU 7 until the signal is supplied to the audio processing block 2, specifically the audio processing CPU 7, and the time since the signal transmission by the audio processing block 2, specifically the audio processing CPU 7 to the moving picture processing CPU 17 until the signal is supplied to the moving picture processing CPU 17, are estimated as the communication time error.

Specifically, the moving picture processing CPU 17 calculates the communication time error Tva in accordance with the equation: $Tva=(tv2-tv1)/2$, under control by the synchronization controller 12 (step D7). Meanwhile, the communication time error Tva may be computed by the synchronization controller 12.

The value Tva may be expressed by $Tva=f(tv2, tv1, TVAratio)$, where TVAratio is the ratio of the estimated rate of transmission of the transmission channel from the moving picture processing block 11 to the audio processing block 2 and estimated rate of transmission of the transmission channel from the audio processing block 2 to the moving picture processing block 11. For example, the value Tva may be expressed by $Tva=(tv2-tv1) \times TVAratio$.

Returning to FIG. 2, the moving picture processing CPU 17 sends an audio processing start signal (such as an audio reproduction request signal or an audio recording request signal) commanding the start of the audio processing through the moving picture processing CPU 17 to the audio processing block 2, specifically the audio processing CPU 7, under control by the synchronization controller 12 (step S4).

On receipt of the audio processing start signal, the audio processing CPU 7 allows the audio processing unit 4 to execute the audio processing (reproduction or recording) responsive to the audio processing start signal received, while resetting the audio processing counter 3 to actuate the audio processing counter 3.

The moving picture processing CPU 17 receives a moving picture processing start command signal (for example, the moving picture reproduction start signal or the moving picture recording start signal), commanding the start of the moving picture processing, from the synchronization controller 12, at a timing when a previously calculated transmission time (value Tva) has elapsed as from the transmission of the sound processing start signal.

On receipt of the moving picture processing start command signal, the moving picture processing CPU 17 allows the moving picture processing unit 16 to execute the moving picture processing (reproduction or recording) in keeping with the moving picture processing start command received, while resetting the moving picture processing counter 13 to actuate the moving picture processing counter 13.

By executing the steps S4 to S6, the synchronization timing error ascribable to the transmission time of the signal transmitted between the moving picture processing block 11 and the sound processing block may be eliminated to permit the moving picture processing and the audio processing to be started at the same timing. on the other hand, the moving picture processing counter 13 and the audio processing counter 3 start the count operation at the same timing.

Thus, even though the audio processor, processing the sound, such as the audio or the like, and the moving picture processing unit, processing the moving picture, are controlled by different controllers, such as CPUs, it is possible to synchronize the sound, such as audio, and the moving picture.

The moving picture processing CPU 17 then checks whether or not the difference between the TSync value and the CountVOut value as a count value of the moving picture processing counter 13 has become larger than the re-synchronization decision value TLimit, under control by the synchronization controller 12 (step S7).

If, in the step S7, the difference between the TSync value and the CountVOut value as a count value of the moving picture processing counter 13 is not larger than the re-synchronization decision value TLimit, the moving picture processing CPU 17 re-executes the step S7, under control by the synchronization controller 12.

If, in the step S7, the difference between the TSync value and the CountVOut value, as a count value of the moving picture processing counter 13, is larger than the re-synchronization decision value TLimit, the moving picture processing CPU 17 substitutes the CountVOut value, as the count value of the moving picture processing counter 13, into the TSync value, under control by the synchronization controller 12 (step S8), to estimate the CountAOut value, as a count value of the audio processing counter 3 (step S9).

Figure 4:
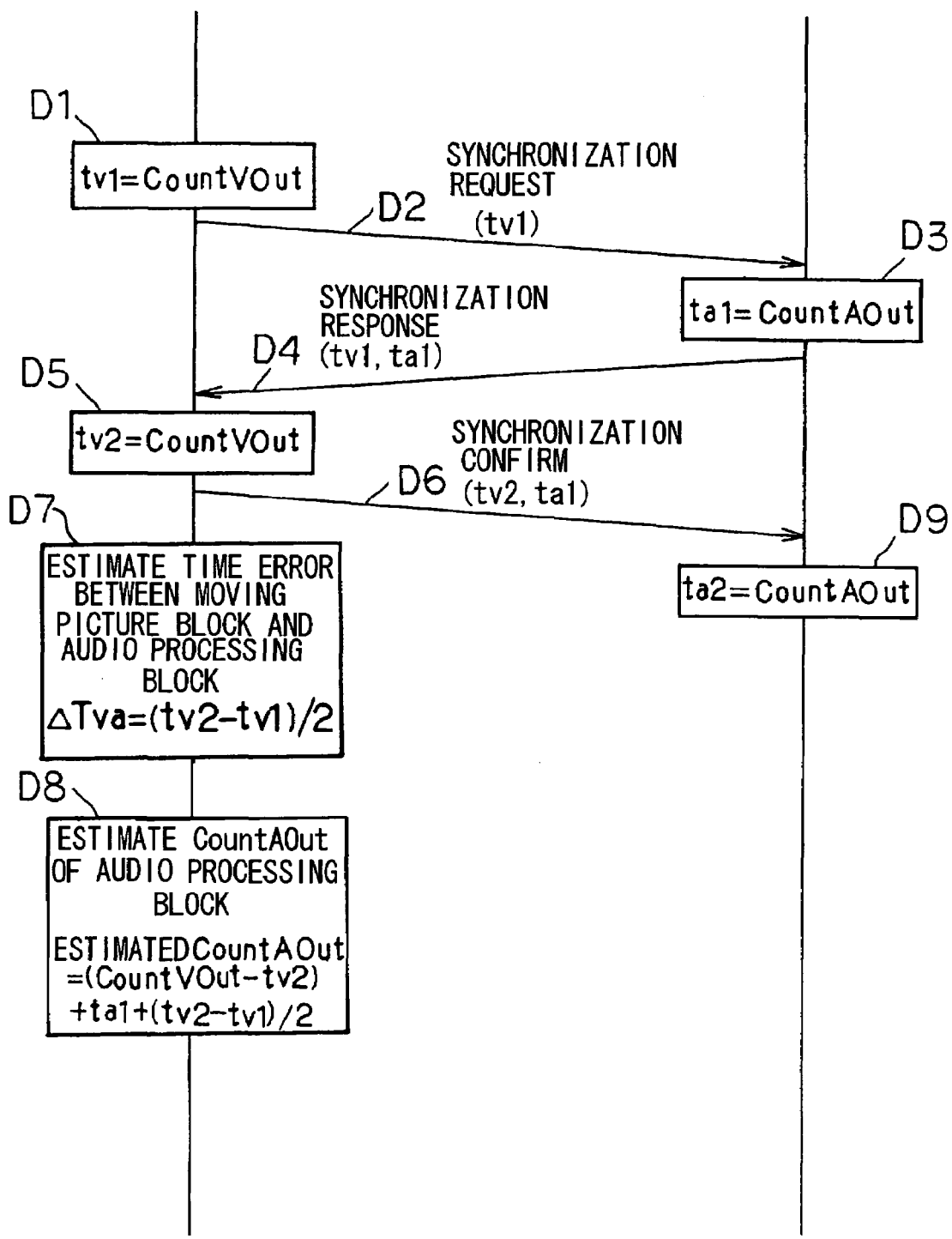
FIG. 4 is a sequence diagram for illustrating an example of a step S9 shown in FIG. 2.

FIG. 4 is a sequence diagram illustrating an example of a step S9. In FIG. 4, the same processing as in FIG. 3 is indicated by the same reference numeral. Referring to FIG. 4, the example of the step S9 is explained.

The moving picture processing CPU 17 substitutes the CountVOut value, as a count value of the moving picture processing counter 13, for the variable tv1, under control by the synchronization controller 12 (step D1) and, substantially simultaneously as the step D1, sends a synchronization request to the audio processing block 2, specifically the audio processing CPU 7 (step D2). Meanwhile, the variable tv1 is appended as an argument to the synchronization request executed in the step D2.

The audio processing block 2, specifically the audio processing CPU 7, which has received the synchronization request, executed in the step D2, substitutes the CountAOut value, as the count value of the audio processing counter 3, for the variable ta1 (step D3).

The audio processing block 2, specifically the audio processing CPU 7, which has received the synchronization request, executed in the step D2, sends a synchronization response to the moving picture processing block 11, specifically the moving picture processing CPU 17 (step D4). The variables tv1 and ta1 may be appended as arguments to the synchronization response executed in the step D4.

The moving picture processing block 11, specifically the moving picture processing CPU 17, which has received the synchronization response, executed in the step D4, substitutes the CountVOut value, as the count value of the moving picture processing counter 13, for the variable tv2, under control by the synchronization controller 12 (step D5). Substantially simultaneously as the step D5, the synchronization confirmation is sent to the audio processing block 2, specifically the audio processing CPU 7 (step D6). At least the variable tv2 may be appended as an argument to the synchronization confirmation executed in the step D6.

The audio processing block 2, which has received the synchronization confirmation, executed in the step D6, substitutes the CountAOut value, as a count value of the audio processing counter 3, into the variable ta2 (step D9). This step D9 may, however, be omitted.

The moving picture processing block 11, specifically the moving picture processing CPU 17, estimates the communication time error between the moving picture processing block 11 and the audio processing block 2, under control by the synchronization controller 12 (step D7). Specifically, the moving picture processing CPU 17 calculates the communication time error Tva in accordance with the equation Tva=(tv2−tv1)/2, under control by the synchronization controller 12 (step D7). The communication time error Tva may also be calculated by the synchronization controller 12.

The moving picture processing block 11, specifically the moving picture processing CPU 17, then estimates the CountAOut value of the audio processing counter 3, associated with the CountVOut value, as the count value of the moving picture processing counter 13 at a desired timing, under control by the synchronization controller 12 (step D8). The equation for estimating the count value CountAOut of the audio processing counter 3 may, for example, be given as follows:

$$\text{Estimated } CountAOut = (CountVOut - tv2) + ta1 + (tv2 - tv1)/2.$$

Meanwhile, the estimated CountAOut may also be calculated by the synchronization controller 12.

Returning to FIG. 2, the moving picture processing CPU 17 verifies whether or not the estimated CountAOut value, as the estimated count value of the audio processing counter 3 at a desired timing differs from the CountVOut value, as the estimated count value of the moving picture processing counter 13 at the desired timing, under control by the synchronization controller 12 (step S10).

If, in the step S10, the CountAOut value, as the estimated count value of the audio processing counter 3 at a desired timing, does not differ from the CountVOut value, as the estimated count value of the moving picture processing counter 13 at the desired timing, under control by the synchronization controller 12, the moving picture processing CPU 17 determines, under control by the synchronization controller 12, that the moving picture is synchronized with the audio, and reverts to the step S7.

If, in the step S10, the CountAOut value, as the estimated count value of the audio processing counter 3 at the desired timing, differs from the CountVOut value, as the estimated count value of the moving picture processing counter 13 at the desired timing, under control by the synchronization controller 12, the moving picture processing CPU 17 determines, under control by the synchronization controller 12, that the moving picture is not synchronized with the audio signal, and verifies whether or not the estimated count value of the audio processing counter 3 at the desired timing is larger than the CountVOut value, as the estimated count value of the moving picture processing counter 13 at the desired timing (step S11).

If it is found in the step S11 that the estimated count value of the audio processing counter 3 at the desired timing is larger than the CountVOut value, as the estimated count value of the moving picture processing counter 13 at the desired timing, the moving picture processing CPU 17 determines, under control by the synchronization controller 12, that the processing of moving picture lags the audio, and performs the skipping processing of advancing the moving picture processing by a time equal to the estimated CountAOut value less the CountVOut value (step S12).

In the step S12, the operation of advancing the moving picture processing may be the fast operation of the moving picture processing (fast-forwarding).

When the step S12 has come to a close, the moving picture processing CPU 17 returns to the step S7, under control by the synchronization controller 12.

If it is found in the step S11 that the estimated count value CountAOut value of the audio processing counter 3 at the desired timing is not larger than the CountVOut value, as the count value of the moving picture processing counter 13 at the desired timing, the moving picture processing CPU 17 determines, under control by the synchronization controller 12, that the processing of moving picture leads the audio, and halts the moving picture processing by a time equal to the estimated CountVOut value less the CountAOut value (step S13).

In the step S13, the operation of halting the moving picture processing may be the slow operation of the moving picture processing (slow forwarding).

When the step S13 has come to a close, the moving picture processing CPU 17 returns to the step S7, under control by the synchronization controller 12.

The operation shown in FIG. 2 may be carried out by the synchronization controller 12.

In the present embodiment, since the count value of the audio processing counter is estimated as the timing error ascribable to the transmission time of the signal transmitted between the moving picture processing block 11 and the sound processing block, the moving picture and the sound may be synchronized with each other based on the count value of the audio processing counter 3 and the count value of the moving picture processing counter 13.

Moreover, with the present embodiment, the audio may be synchronized with the moving picture even if the audio processing CPU controlling the audio processing unit 4 differs from the moving picture processing CPU 17 controlling the moving picture processing unit 16. In this manner, if an external sound processing block is used, the sound and the moving picture may be synchronized with each other.

Additionally, with the present embodiment, in which the operation of the step S8 ff. proceeds intermittently, the audio may be intermittently synchronized with the moving picture even in case the audio processing speed of the audio processing unit 4 controlled by the audio processing CPU 7 differs from the moving picture processing speed of the moving picture processing unit 16 controlled by the moving picture processing CPU 17.

Figure 5:
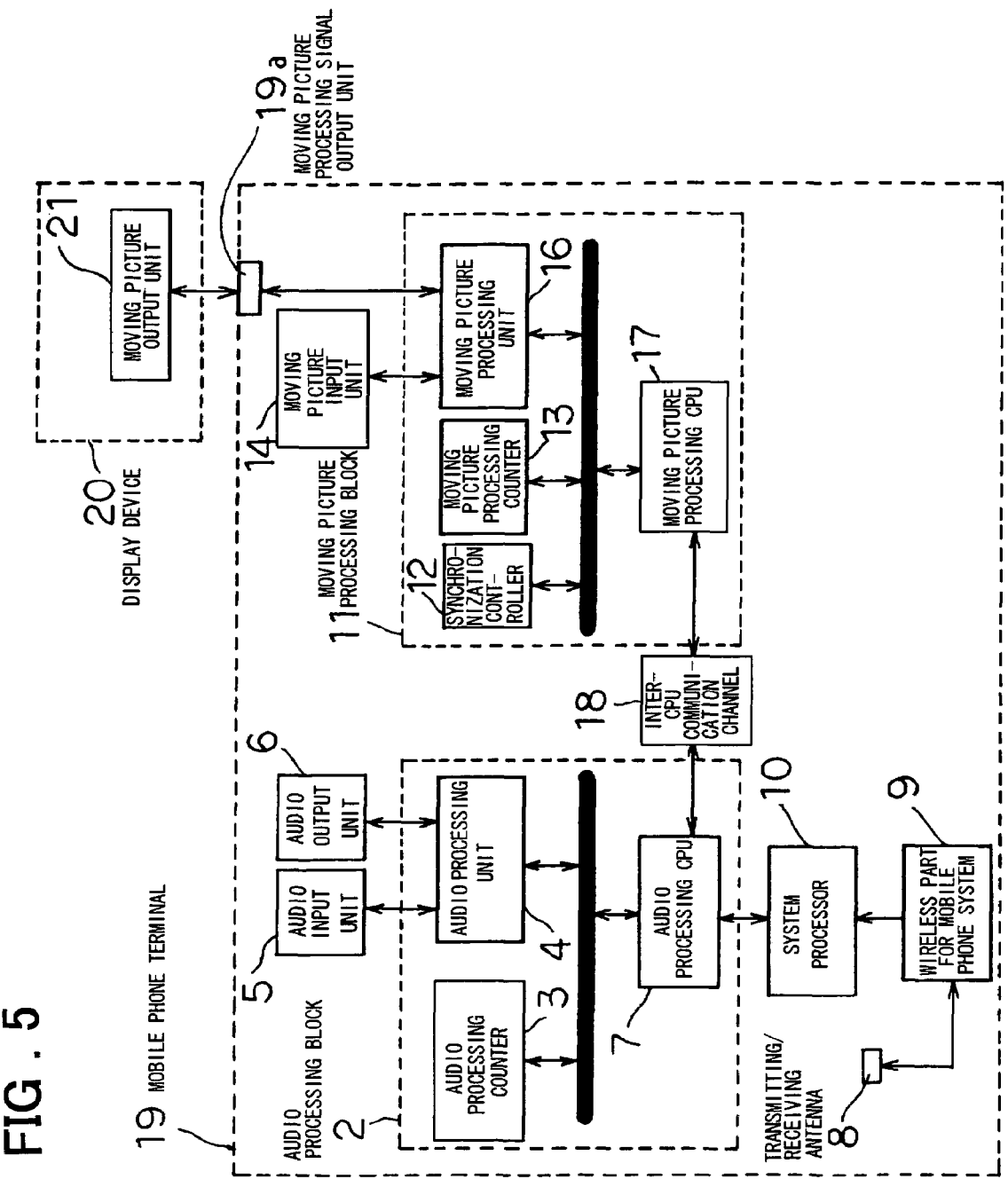
FIG. 5 is a block diagram showing a mobile phone terminal according to another embodiment of the present invention.

FIG. 5 is a block diagram illustrating the configuration of a mobile phone terminal according to a modification of the present invention. In FIG. 5, parts or components with the same structure as those shown in FIG. 1 are depicted by the same reference numerals.

In FIG. 5, a mobile phone terminal 19 is connected wirelessly or over a cable to an external display device 20 via a moving picture processing signal output unit 19a, adapted for sending out an output of the moving picture processing unit 16 to outside. A moving picture is displayed by a moving picture output unit 21, operating as a display provided in a display device 20. The operation of the mobile phone terminal 19 shown in FIG. 5 is similar to that of the mobile phone terminal 1 shown in FIG. 1.

Figure 6:
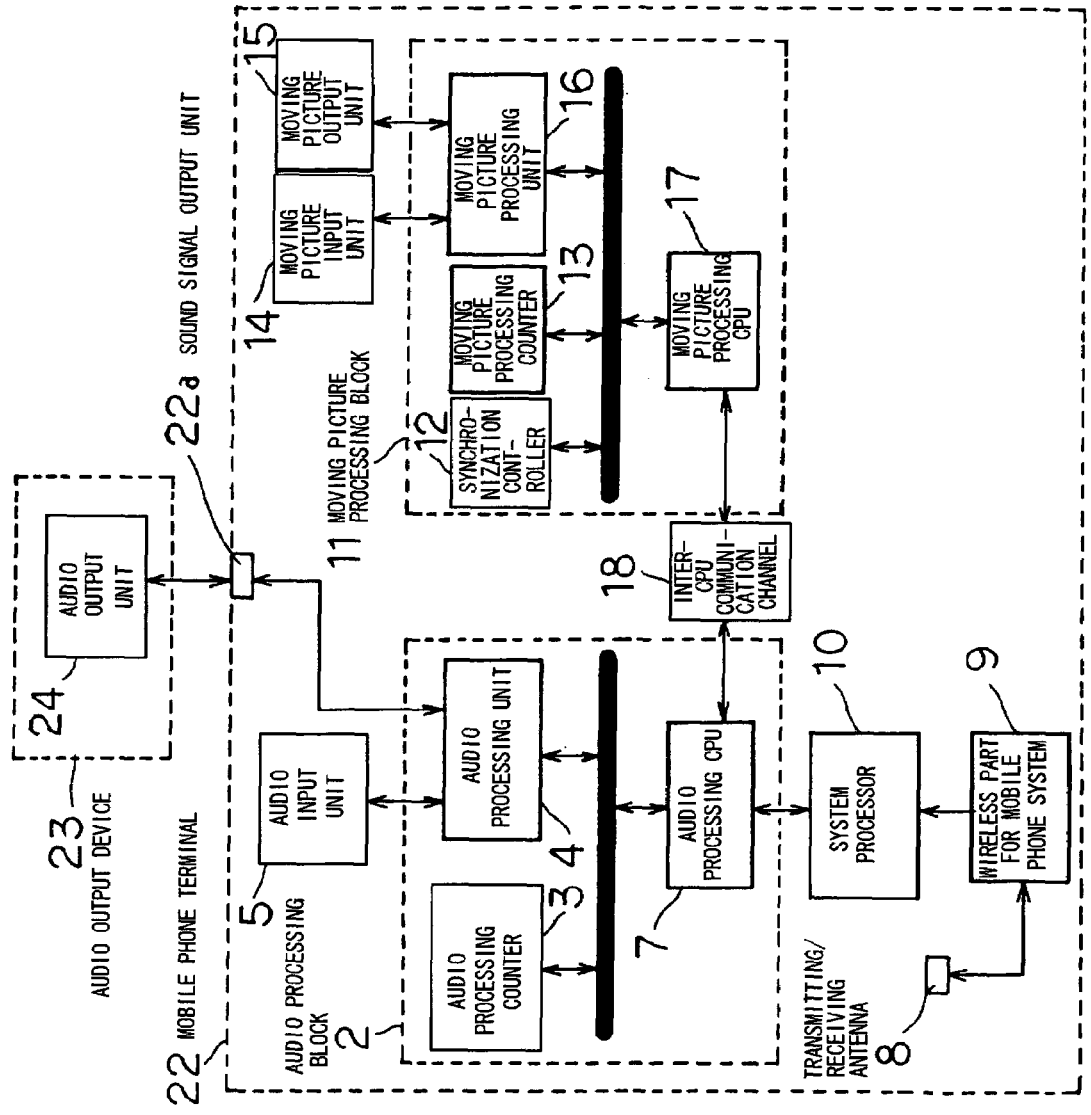
FIG. 6 is a block diagram showing a mobile phone terminal according to a further embodiment of the present invention.

FIG. 6 is a block diagram illustrating the configuration of a mobile phone terminal according to another modification of the present invention. In FIG. 6, parts or components with the same structure as those shown in FIG. 1 are depicted by the same reference numerals.

In FIG. 6, a mobile phone terminal 22 is connected wirelessly or over a cable to an external audio (audio) outputting device 23 via an audio signal output unit 22a, configured for sending out the output of the audio processing unit 4 to outside. The audio is output from an audio output unit 24, such as a loudspeaker, provided within the audio outputting device 23. It is noted that the operation of the mobile phone terminal 22 is the same as that of the mobile phone terminal 1 shown in FIG. 1.

Figure 7:
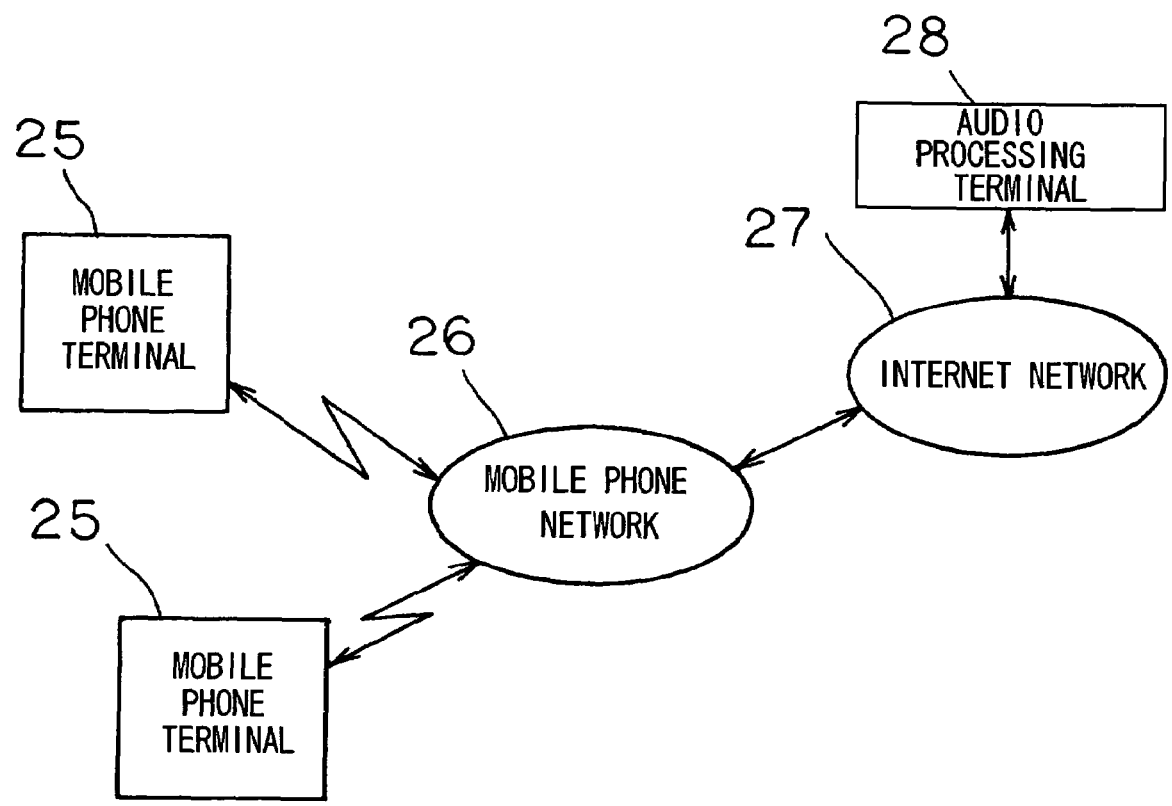
FIG. 7 is a block diagram showing an example of a using form of the mobile phone terminal embodying the present invention.

FIG. 7 is a block diagram showing the system configuration of use of a mobile phone terminal according to still another modification of the present invention.

Referring to FIG. 7, a mobile phone terminal 25 is connected to an audio processing terminal 28, carrying out the audio processing, via an Internet network 27, incapable of assuring transmission delay, and a mobile phone network (mobile phone system) 26.

Figure 8:
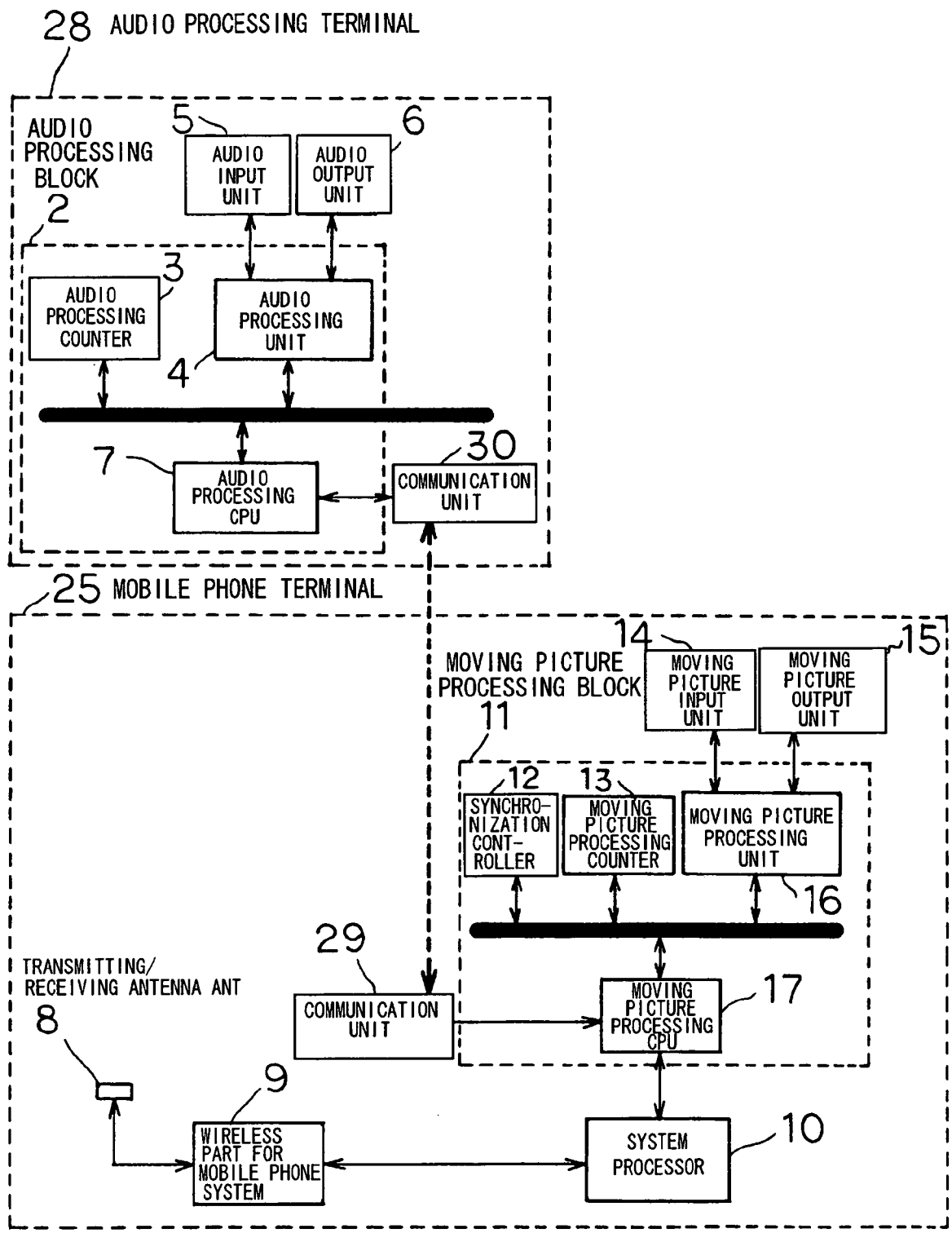
FIG. 8 is a block diagram showing a mobile phone terminal according to a further embodiment of the present invention.

FIG. 8 is a block diagram showing the configuration of the mobile phone terminal 25 shown in FIG. 7 and the audio processing terminal 28. In FIG. 8, parts or components with the same structure as those shown in FIG. 1 are depicted by the same reference numerals.

Referring to FIG. 8, the mobile phone terminal 25 includes a transmission/reception antenna 8, a wireless part for the mobile phone 9, a system processor 10, a moving picture input unit 14, a moving picture output unit 15, a moving picture processing block 11 and a communication unit 29.

The communication unit 29 may be connected to the audio processing terminal 28 over the mobile phone network 26 and the Internet network 27 for communication with the audio processing terminal. The communication unit 29 may be connected to the audio processing terminal 28 for communication therewith over cables, not shown.

The audio processing terminal 28 includes an audio input unit 5, an audio output unit 6, an audio processing block 2 and a communication unit 30. The audio processing CPU 7 is connected to the moving picture processing CPU 17 over the communication unit 30, Internet network 27, mobile phone network 26 and the communication unit 29. The communication units 29, 30 may be interconnected over a cable, not shown. The operation of the mobile phone terminal 25 is similar to that of the mobile phone terminal 1 shown in FIG. 1.

In the present embodiment, the sound processing block, responsible for audio processing, may be arranged on the outer side of the mobile phone terminal. In case the sound processing block, arranged outside the mobile phone terminal, can be connected wirelessly or via a cable to a plural number of mobile phone terminals, the sound processing block can be co-owned by the plural mobile phone terminals.

Consequently, moving picture may be reproduced simultaneously by plural mobile phone terminals by employing an acoustic system having superior acoustic effects or a remote loudspeaker as the sound processing block (audio processing terminal).

In each of the above embodiments, the synchronization controller 12 is provided on the side of the moving picture processing block. Alternatively, the synchronization controller may be provided on the side of the sound processing block.

Figure 9:
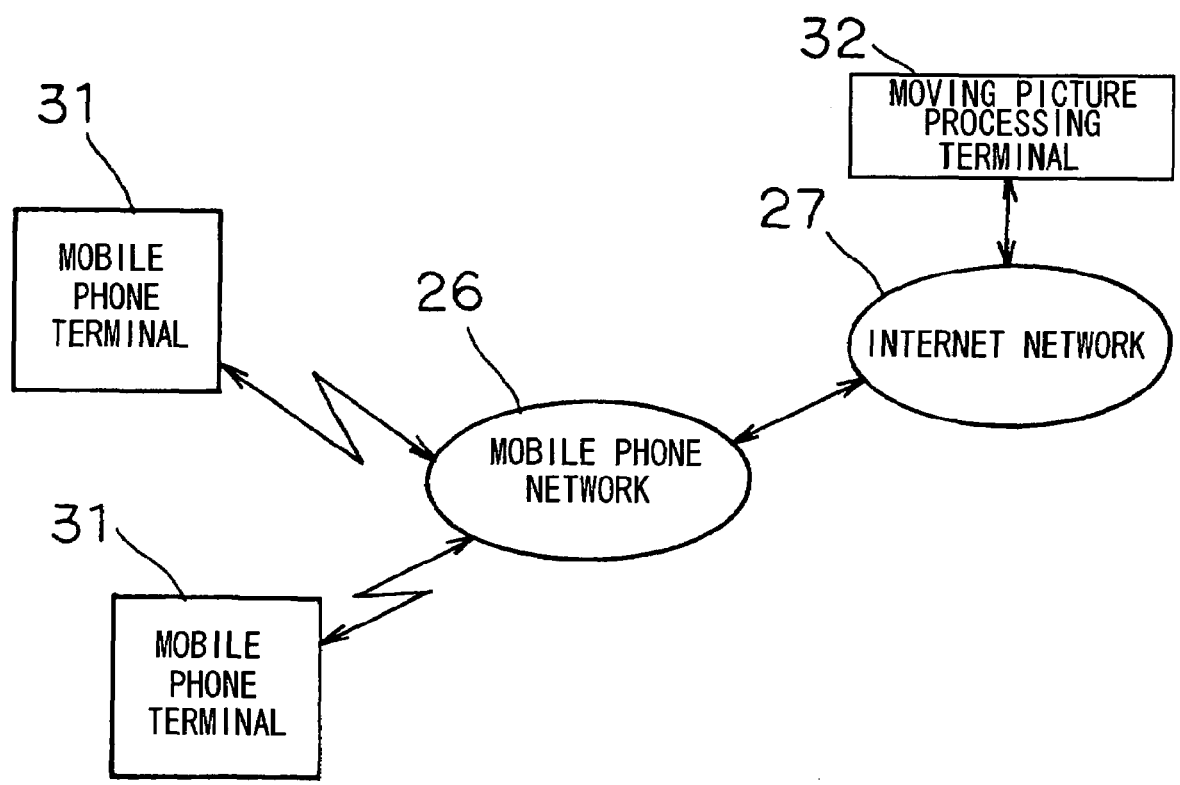
FIG. 9 is a block diagram showing an example of a using form of the mobile phone terminal embodying the present invention.

FIG. 9 shows, in a block diagram, the using form of another embodiment of the mobile phone terminal of the present invention. In FIG. 9, the same parts or components as those of FIG. 7 are depicted by the same reference numerals.

Referring to FIG. 9, a mobile phone terminal 31 is connected to a moving picture processing terminal 32, processing the moving picture, via a mobile phone network 26 and an Internet network 27, incapable of assuring transmission delay.

Figure 10:
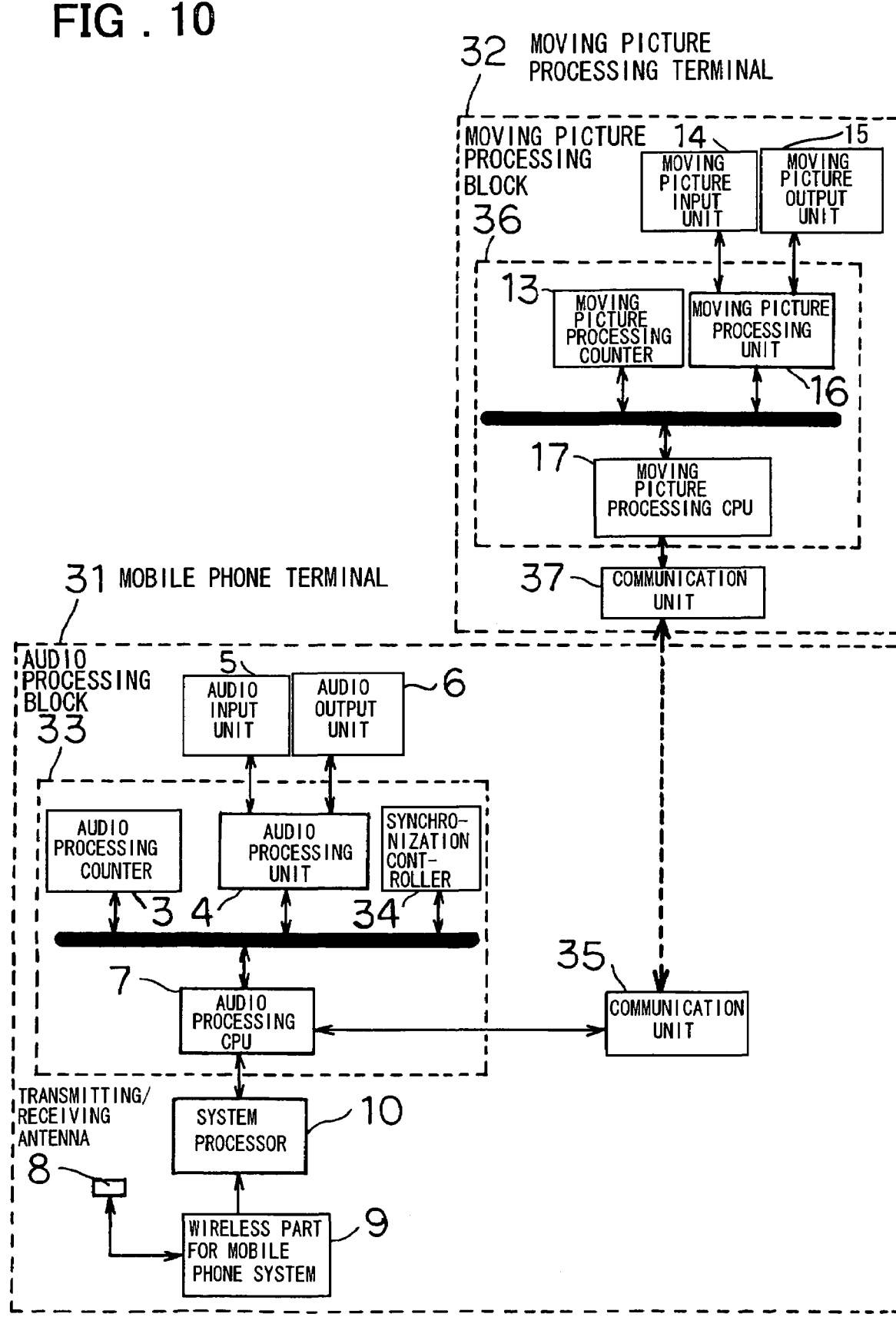
FIG. 10 is a block diagram showing a mobile phone terminal according to a further embodiment of the present invention.

FIG. 10 is a block diagram illustrating the configuration of the mobile phone terminal 31 and the moving picture processing terminal 32 shown in FIG. 9. In FIG. 10, the same parts or components as those of FIG. 1 are depicted by the same reference numerals.

Referring to FIG. 10, the mobile phone terminal 31 includes a transmitting/receiving antenna 8, a wireless part for the mobile phone system 9, a system processor 10, an audio input unit 5, an audio output unit 6, a sound processing block 33 and a communication unit 35.

The mobile phone terminal 31 executes moving picture processing using a moving picture processing block 36.

The sound processing block 33 includes an audio processing counter 3, an audio processing unit 4, an audio processing CPU 7, and a synchronization controller 34 for exercising synchronism control of the sound processing block 33 and the moving picture processing block 36 in the moving picture processing terminal 32.

The moving picture processing terminal 32 includes a moving picture input unit 14, a moving picture output unit 15, a moving picture processing block 36 and a communication unit 37.

The moving picture processing block 36 includes a moving picture processing unit 16, a moving picture processing counter 13 and a moving picture processing CPU 17.

The audio processing CPU 7 and the moving picture processing CPU 17 are interconnected via communication unit 35, mobile phone network 26, Internet network 27 and communication unit 37. The communication unit 35 and the communication unit 37 may also be interconnected over e.g., a cable.

The synchronization controller 34 performs transmission time calculation processing for calculating the transmission time of signals between the sound processing block 33, specifically the audio processing CPU 7, and the moving picture processing CPU 17. Meanwhile, the technical matter of the synchronization controller 34 executing the transmission time calculating processing includes the technical matter of the synchronization controller 34 controlling the audio processing CPU 7 to allow the audio processing CPU 7 to execute the transmission time calculating processing.

The synchronization controller 34 performs the processing for synchronizing the moving picture processing by the moving picture processing unit 16 with the audio processing by the audio processing unit 4. Meanwhile, the technical matter of the synchronization controller 34 executing the synchronizing processing includes the technical matter of the synchronization controller 34 controlling the audio processing CPU 7 to allow the audio processing CPU 7 to execute the synchronizing processing.

An example of the synchronizing processing, carried out by the synchronization controller 34, is now described.

The synchronization controller 34 acquires a count value of the moving picture processing counter 13 through the audio processing CPU 7.

The synchronization controller 34 then calculates the count value of the moving picture processing counter 13, at a desired timing, based on the count value of the moving picture processing counter 13 acquired, a count value of the audio processing counter 3 when the count value of the movable picture processing counter 13 has been acquired, a count value of the audio processing counter 3 at a desired timing, and on the calculated transmission time.

The synchronization controller 34 then controls the processing speed of the audio processor 4, through the audio processing CPU 7, for decreasing the difference between the count value of the moving picture processing counter 13 calculated at the desired timing and the count value of the audio processing counter 3 at the desired timing.

Another example of the synchronizing processing, carried out by the synchronization controller 34, is described below.

The synchronization controller 34 sends a moving picture processing start command signal for commanding the start of moving picture processing (for example, a signal for starting moving picture reproduction or a signal for starting moving picture recording) through the audio processing CPU 7 to a moving picture processing block 36, specifically, to the moving picture processing CPU 17, while sending an audio processing start command signal for commanding the start of audio processing (for example, an audio reproduction start signal or an audio recording start signal), commanding the start of audio processing, to the audio processing CPU 7, at a timing when a pre-calculated time has elapsed as from the transmission of the moving picture processing start signal.

On receipt of the audio processing start command signal, the moving picture processing CPU 17 causes the moving picture processing unit 16 to execute moving picture processing, corresponding to the so received moving picture processing start command signal. on receipt of the audio processing start signal, the audio processing CPU 7 allows the audio processor 4 to execute the audio processing, responsive to the so received audio processing start signal.

Meanwhile, in the present embodiment, when the synchronization controller 34 controls the audio processing CPU 7 to execute the above synchronizing processing, the synchronization controller 34 and the audio processing CPU 7 make up a synchronization controller of the present invention.

The operation of the mobile phone is hereinafter described.

Figure 11:
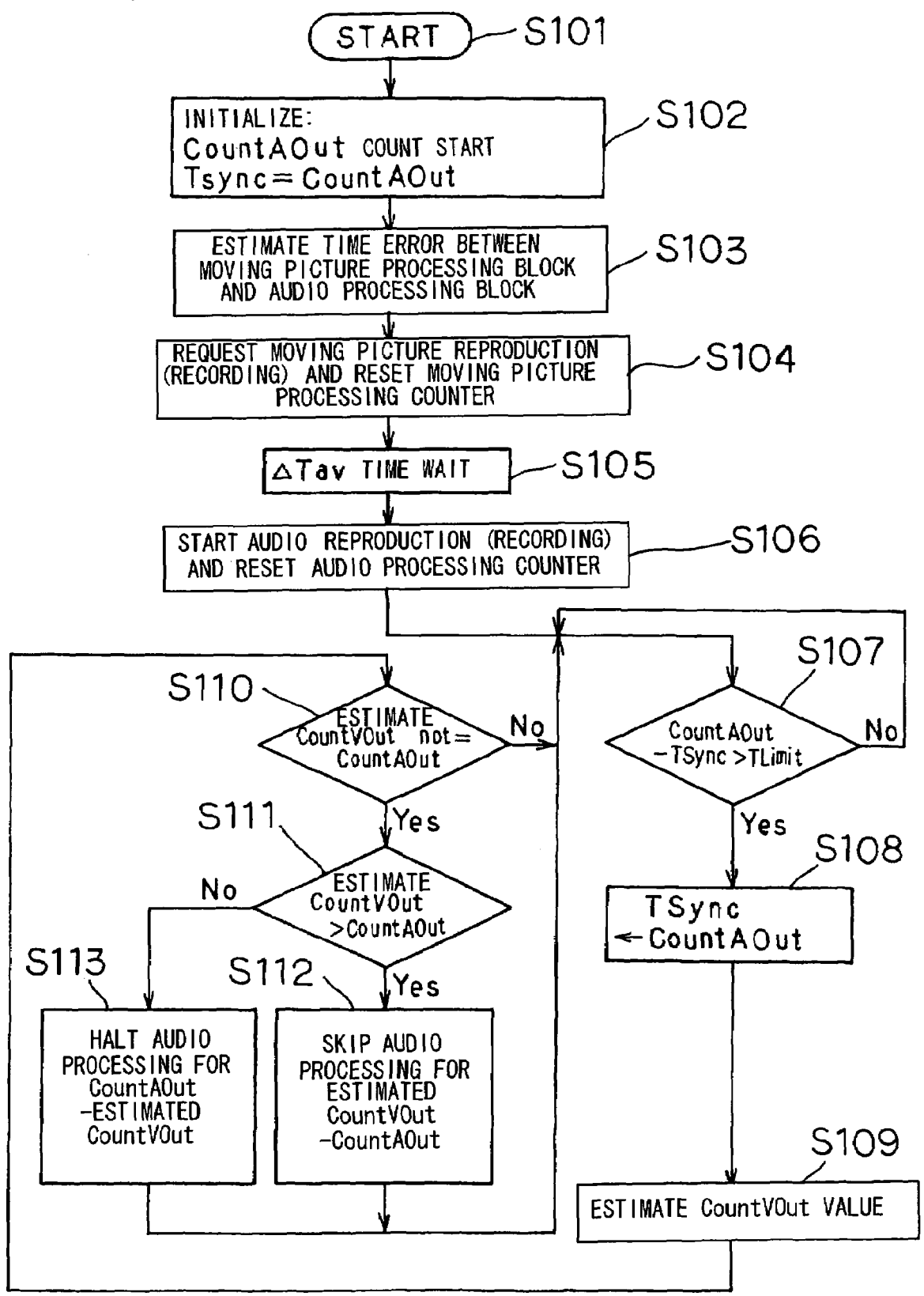
FIG. 11 is a flowchart for illustrating the operation of a mobile phone terminal shown in FIG. 10.

FIG. 11 is a flowchart illustrating the operation of the mobile phone terminal 31 shown in FIG. 10. Referring to FIG. 11, the operation of the mobile phone terminal 31, shown in FIG. 10, is now explained.

For example, when a user acts on a key, not shown, to command the reproduction or the recording of the moving picture, provided with audio (step S101), the synchronization controller 34 controls the audio processing CPU 7 to start the count of the audio processing counter 3 (CountAOut), by way of an initializing operation. The synchronization controller 34 also controls the audio processing CPU 7 to substitute the count value (CountAOut value) of the audio processing counter 3 into a TSync value indicating the synchronizing processing start timing (step S102).

Meanwhile, the TSync value is stored in the audio processing CPU 7. Although the count operation by the audio processing counter 3 is started in the step S102, the audio processing is not carried out at this time point by the audio processor 4.

The synchronization controller 34 then calculates the transmission time of a signal transmitted between the sound processing block 33 (specifically, the audio processing CPU 7) and the moving picture processing block 36 (specifically, the moving picture processing CPU 17) (time error estimation) (step S103).

FIG. 12 is a sequence diagram illustrating the processing in the step S103 shown in FIG. 11.

Referring to FIG. 12, the processing for calculating the transmission time of the step S3 (time error estimation) is explained.

Under control by the synchronization controller 34, the audio processing CPU 7 in the sound processing block 33 substitutes the CountAOut value, as a count value of the audio processing counter 3, for a variable ta1 (step D10), and transmits a synchronizing request to the moving picture processing block 36, specifically the moving picture processing CPU 17, substantially simultaneously as the step D10 (step D11). Meanwhile, the variable ta1 is attached, as an argument, to the synchronizing request, executed in the step D11.

The moving picture processing block 36, specifically the moving picture processing CPU 17, which has received the synchronizing request, executed in the step D11, substitutes the CountVOut value, as a count value of the moving picture processing counter 13, for a variable tv1 (step D12). Meanwhile, this step D12 may be omitted.

The moving picture processing block 36, specifically the moving picture processing CPU 17, which has received the synchronization request, executed in the step D11, sends a synchronization request to the sound processing block 33, specifically to the audio processing CPU 7 (step D13). The variables tv1 and ta1 may be attached as arguments to the request, executed in the step D13. Meanwhile, in case the step D12 is omitted, only the variable ta1 may be attached as argument to the synchronization request executed in the step D13.

The sound processing block 33, specifically the audio processing CPU 7, which has received the sync response, executed in the step D13, substitutes the CountAOut value, as a count value of the audio processing counter 3, for a variable ta2, under control by the synchronization controller 34 (step D14). Substantially simultaneously as the step D14, synchronization confirmation is sent to the moving picture processing block 36, specifically the moving picture processing CPU 17 (step D15). At least the variable ta2 may be attached as an argument to the synchronization confirmation executed in the step D15.

The moving picture processing block 36, which has received the synchronization confirmation, executed in the step D15, substitutes the CountVOut value, as a count value of the moving picture processing counter 13, for a variable tv2 (step D18). Meanwhile, this step D18 may be omitted.

The sound processing block 11, specifically the audio processing CPU 7, estimates the communication time error between the moving picture processing block 36 and the sound processing block 33, under control by the synchronization controller 34.

In the present embodiment, the time since the signal transmission by the moving picture processing block, specifically the moving picture processing CPU 17, to the audio processing block 2, specifically the audio processing CPU 7, until the signal is entered to the audio processing block 2, specifically the audio processing CPU 7, and the time since the signal transmission by the audio processing block 2, specifically the audio processing CPU 7, to the moving picture processing block, specifically the moving picture processing CPU 17, until the signal is entered to the moving picture processing block, specifically moving picture processing CPU 17, are estimated as the communication time error.

Specifically, the audio processing CPU 7 calculates the communication time error Tav in accordance with the following equation:

$$Tav = (ta2 - ta1)/2,$$

under control by the synchronization controller 34 (step D16). Meanwhile, the communication time error Tav may be computed by the synchronization controller 34.

The value Tav may be expressed by $$Tav = f(ta2, ta1, TAVratio),$$

where TAVratio is the ratio of the estimated rate of transmission of the transmission channel from the sound processing block 33 to the moving picture processing block 33 and the estimated rate of transmission of the transmission channel from the moving picture processing block 36 to the sound processing block 33. For example, the value Tav may be expressed as follows:

$$Tav = (ta2 - ta1) \times TAVratio.$$

Returning to FIG. 11, the audio processing CPU 7 sends a moving picture processing start command signal (such as a moving picture reproduction start signal or a moving picture recording request signal) for commanding the start of the moving picture processing through the audio processing CPU 7 to the moving picture processing block 36, specifically the moving picture processing CPU 17, under control by the synchronization controller 34 (step S104).

On receipt of the moving picture processing start signal, the moving picture processing CPU 17 allows the moving picture processing unit 18 to execute the moving picture processing (reproduction or recording) responsive to the moving picture processing start signal received, while resetting the moving picture processing counter 13 to actuate the moving picture processing counter 3.

The audio processing CPU 7 receives an audio processing start command signal (for example, the audio reproduction start signal or the audio recording start signal) for commanding the start of the audio processing, from the synchronization controller 34, at a timing when a previously calculated transmission time (value Tav) has elapsed as from the transmission of the moving picture processing start command signal.

On receipt of the audio processing start command signal, the audio processing CPU 7 allows the audio processor 4 to execute the audio processing (reproduction or recording) in keeping with the audio processing start signal received, while resetting the audio processing counter 3 to actuate the audio processing counter 3.

By executing the steps S104 to S106, the synchronization timing error ascribable to the transmission time of the signal transmitted between the moving picture processing block 36 and the sound processing block 33, may be eliminated to permit the audio processing and the moving picture processing to be started at the same timing. on the other hand, the moving picture processing counter 13 and the audio processing counter 3 start the count operation at the same timing.

Thus, even though the audio processor, processing the sound, such as the audio, and the moving picture processing unit, processing the moving picture, are controlled by different controllers, such as CPUs, it is possible to synchronize the sound, such as audio, and the moving picture.

The audio processing CPU 7 then checks whether or not the difference between the TSync value, and the CountAOut value, as a count value of the audio processing counter 3, has become larger than the re-synchronization decision value TLimit, under control by the synchronization controller 34 (step S107).

If, in the step S7, the difference between the TSync value and the CountAOut value, as the count value of the audio processing counter 3, is not larger than the re-synchronization decision value TLimit, the audio processing CPU 17 re-executes the step S107, under control by the synchronization controller 34.

If, in the step S107, the difference between the TSync value and the CountAOut value as the count value of the audio processing counter 3 is larger than the re-synchronization decision value TLimit, the audio processing CPU 7 substitutes the CountAOut value, as a count value of the audio processing counter 3, into the TSync value, under control by the synchronization controller 34 (step S108), to estimate the CountVOut value, as a count value of the moving picture processing counter 13 (step S109).

FIG. 13 is a sequence diagram illustrating an example of the step S109. In FIG. 13, the same processing as in FIG. 12 is indicated by the same reference numeral. Referring to FIG. 4, the example of the step S109 is described.

The audio processing CPU 7 substitutes the CountAOut value, as the count value of the audio processing counter 3, for the variable ta1, under control by the synchronization controller 34 (step D10) and, substantially simultaneously as the step D10, sends a synchronization request to the moving picture processing block 36, specifically the moving picture processing CPU 17 (step D11). Meanwhile, the variable ta1 is appended as an argument to the synchronization request executed in the step D11.

The moving picture processing block 36, specifically the moving picture processing CPU 17, which has received the synchronization request, executed in the step D11, substitutes the CountVOut value, as a count value of the moving picture processing counter 13, for the variable tv1 (step D12).

The moving picture processing block 36, specifically the moving picture processing CPU 17, which has received the synchronization request, executed in the step D11, sends a synchronization response to the sound processing block 33, specifically the audio processing CPU 7 (step D13). The variable tv1 and the variable Ta1 may be appended as arguments to the synchronization response executed in the step D13.

The sound processing block 33, specifically the audio processing CPU 7, which has received the synchronization response, executed in the step D13, substitutes the CountAOut value, as a count value of the audio processing counter 3, for the variable ta2, under control by the synchronization controller 34 (step D14). Substantially simultaneously, the audio processing CPU sends the synchronization confirmation to the moving picture processing CPU 17 (step D15). Meanwhile, at least the variable ta2 may be attached as an argument to the synchronization confirmation executed in the step D15.

The moving picture processing block 36, which has received the synchronization confirmation, executed in the step D15, substitutes the CountVOut value, as a count value of the moving picture processing counter 13, for the variable tv2 (step D18). Meanwhile, the step D18 may be omitted.

The sound processing block 33, specifically the audio processing CPU 7, estimates the communication time error between the moving picture processing block 36 and the sound processing block 33, under control by the synchronization controller 34 (step D16). Specifically, the audio processing CPU 7 calculates the communication time error Tav in accordance with the equation:

$$Tav=(ta2-ta1)/2,$$

under control by the synchronization controller 34 (step D16). The communication time error Tav may also be calculated by the synchronization controller 34.

The sound processing block 33, specifically the audio processing CPU 7, then estimates the CountVOut value of the moving picture processing counter 13, associated with the CountAOut value, as the count value of the audio processing counter 3 at a desired timing, under control by the synchronization controller 34 (step D17). The equation for estimating the count value CountVOut of the moving picture processing counter 13 may, for example, be as follows:

$$\text{Estimated } CountVOut=(CountAOut-ta2)+tv1+(ta2-ta1)/2.$$

Meanwhile, the estimated CountVOut may also be calculated by the synchronization controller 34.

Returning to FIG. 11, the audio processing CPU 7 checks whether or not the estimated CountVOut value, as the estimated count value of the moving picture processing counter 13 at a desired timing, differs from the CountAOut value, as the count value of the audio processing counter 3 at the desired timing, under control by the synchronization controller 34 (step S110).

If, in the step S110, the CountVOut value, as the estimated count value of the moving picture processing counter 13 at a desired timing does not differ from the CountAOut value, as the count value of the audio processing counter 3 at the desired timing, under control by the synchronization controller 34, the audio processing CPU 7 determines, under control by the synchronization controller 34, that the moving picture is synchronized with the audio, and goes back to the step S107.

If, in the step S110, the CountVOut value, as the estimated count value of the moving picture processing counter 13 at a desired timing, differs from the CountAOut value, as the count value of the audio processing counter 3 at the desired timing, under control by the synchronization controller 34, the audio processing CPU 7 determines, under control by the synchronization controller 34, that the moving picture is not synchronized with the audio, and checks whether or not the estimated CountVOut value, as the estimated count value of the moving picture processing counter 13 at the desired timing, is larger than the CountAOut value, as the count value of the audio processing counter 3 at the desired timing (step S111).

If it is found in the step S111 that the estimated count value CountVOut of the moving picture processing counter 13 at the desired timing is larger than the CountAOut value, as the count value of the audio processing counter 3 at the desired timing, the audio processing CPU 7 determines, under control by the synchronization controller 34, that the audio processing lags the processing of moving picture, and performs the skipping processing of advancing the moving picture processing by a time equal to the estimated CountVOut value less the CountAOut value (step S112).

In the step S112, the operation of advancing the audio processing may be the fast operation of the moving picture processing (fast forwarding).

When the step S12 has come to a close, the audio processing CPU 7 returns to the step S107, under control by the synchronization controller 34.

If it is found in the step S111 that the estimated count value CountVOut value of the moving picture processing counter 13 at the desired timing is not larger than the CountAOut value, as the count value of the audio processing counter 3 at the desired timing, the moving picture processing CPU 17 determines, under control by the synchronization controller 34, that the processing of audio leads the processing of moving picture, and halts the moving picture processing by a time equal to the estimated CountAOut value less the estimated CountVOut value (step S113).

In the step S113, the operation of halting the audio processing may be the slow operation of the moving picture processing (slow-forwarding).

When the step S113 has come to a close, the audio processing CPU 7 returns to the step S107, under control by the synchronization controller 34.

The operation shown in FIG. 11 may be carried out by the synchronization controller 34.

In the present embodiment, since the count value of the moving picture processing counter 13 is estimated as the timing error ascribable to the signal transmission time between the moving picture processing block 36 and the sound processing block 33, the moving picture and the sound may be synchronized with each other based on the count value of the audio processing counter 3 and the count value of the moving picture processing counter 13.

Moreover, with the present embodiment, the audio may be synchronized with the moving picture even if the audio processing CPU controlling the audio processing unit 4 differs from the moving picture processing CPU 17 controlling the moving picture processing unit 16. In this manner, the sound and the moving picture may be synchronized with each other even if an external moving picture processing block, for example, is used.

Additionally, with the present embodiment, in which the operation of the step S108 ff. proceeds intermittently, the audio may be intermittently synchronized with the moving picture, even in case the audio processing speed of the audio processing unit 4, controlled by the audio processing CPU 7, differs from the moving picture processing speed of the moving picture processing unit 16, controlled by the moving picture processing CPU 17.

If the moving picture processing block, arranged outside of the mobile phone terminal, is connectable to plural mobile phone terminals, the moving picture processing block may be co-owned by the plural mobile phone terminals, so that, by demonstrating the moving picture on a display screen as a moving picture processing block (moving picture processing terminal), it is possible to realize the function comparable to a cinema house in which the audio recording and reproduction may be carried out simultaneously on plural mobile phone terminals.

In FIG. 10, the moving picture processing terminal 32 may be arranged within the mobile phone terminal 31.

In case the moving picture processing terminal 32 is arranged within the mobile phone terminal 31, the moving picture output unit 15 or the audio output unit 16 may be provided outside the mobile phone terminal 31. When the moving picture output unit 15 is arranged outside the mobile phone terminal 31, the mobile phone terminal 31 may further be provided with a moving picture processing signal output unit for sending out the output of the audio output unit 16 to outside. In this case, the moving picture processing signal output unit may be connected wirelessly or over a cable to the moving picture output unit 15 as an external display device.

In the above-described embodiments, the illustrated structure is merely exemplary and is not to be interpreted as limiting the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mobile phone terminal performing sound processing using a sound processing block including a sound processor unit for processing the sound information expressing sound and a sound processing controller for controlling sound processing by said sound processor unit, said mobile phone terminal comprising:

a moving picture processing unit for processing the moving picture processing information expressing moving picture;

a moving picture processing controller for controlling moving picture processing by said moving picture processing unit; and a synchronization controller for performing transmission time calculating processing for calculating the transmission time of a signal transmitted between said sound processing block and said moving picture processing controller, then compensating the synchronization error between said moving picture processing and said sound processing, based on said transmission time, and for performing synchronization processing for synchronizing the moving picture processing by said moving picture processing unit with the sound processing by said sound processor unit.

2. The mobile phone terminal according to claim 1, further comprising:

a moving picture processing counter for indicating the state of progress of moving picture processing by said moving picture processing unit in terms of a count value;

said sound processing block further includes a sound processing counter for indicating the state of progress of the sound processing by said sound processor unit in terms of a count value;

said synchronization controller acquiring a count value of said sound processing counter via said moving picture processing controller, calculating a count value of said moving picture processing counter at a desired timing, based on a count value of said sound processing counter acquired, a count value of said moving picture processing counter at the time of acquisition of the count value of said sound processing counter, a count value of said moving picture processing counter at a desired timing and on the transmission time as calculated by said transmission time calculating processing, and controlling the processing speed in said moving picture processing unit through said moving picture processing controller so that the difference between the count value of said sound processing counter at said desired timing and the count value of said moving picture processing counter at said desired timing becomes smaller, by way of performing said synchronization processing.

3. The mobile phone terminal according to claim 1, wherein said synchronization controller intermittently performs said transmission time calculating processing and the synchronization processing.

4. The mobile phone terminal according to claim 1, wherein said synchronization controller transmits a sound processing start signal, commanding the start of said sound processing, through said moving picture processing controller to said sound processing block, and transmits a moving picture processing start command signal, commanding the start of said moving picture processing, to said moving picture processing controller, at a timing when the transmission time as calculated by said transmission time calculating processing has elapsed, as from the time of transmission of said sound processing start signal, by way of performing said synchronization processing.

5. The mobile phone terminal according to claim 1, further comprising said sound processing block.

6. The mobile phone terminal according to claim 5, wherein said sound processing block further includes a sound processing signal output unit for sending out an output of said sound processor unit to outside, said sound processing signal output unit being connected through a wireless communication or over a cable to an outside sound outputting device.

7. The mobile phone terminal according to claim 1, wherein said sound processing block is contained in an external sound processing terminal; and wherein said moving picture processing controller is connected wirelessly or over a cable to said sound processing block.

8. The mobile phone terminal according to claim 1, wherein said sound processing block is contained in an external sound processing terminal connectable via a mobile phone system to a plural number of said moving picture processing controllers; and wherein said synchronization controller controls said moving picture processing unit through said moving picture processing controllers for synchronizing said moving picture processing with said sound processing.

9. A mobile phone terminal performing moving picture processing using a moving picture processing block including a moving picture processing unit for processing the moving picture information expressing moving picture and a moving picture processing controller controlling the moving picture processing by said moving picture processing unit, said mobile phone terminal comprising:

a sound processor unit for processing the sound information expressing sound;

a sound processing controller for controlling the sound processing by said sound processor unit; and a synchronization controller for performing transmission time calculating processing for calculating the transmission time of a signal transmitted between said moving picture processing block and said sound processing controller, then compensating the synchronization error between moving picture processing and the sound processing, based on said transmission time, and for performing synchronization processing for synchronizing the moving picture processing by said moving picture processing unit with the sound processing by said sound processor unit.

10. The mobile phone terminal according to claim 9, further comprising:

a sound processing counter for indicating the state of progress of sound processing by said sound processor unit in terms of a count value;

said moving picture processing block further including a moving picture processing counter for indicating the state of progress of the moving picture processing by said moving picture processing unit in terms of a count value;

said synchronization controller acquiring a count value of said moving picture processing counter via said sound processing controller, calculating a count value of said moving picture processing counter at a desired timing, based on a count value of said moving picture processing counter acquired, a count value of said sound processing counter at the time of acquisition of the count value of said moving picture processing counter, a count value of said sound processing counter at said desired timing and on the transmission time as calculated by said transmission time calculating processing, and controlling the processing speed in said sound processor unit through said sound processing controller so that the difference between the count value of said moving picture processing counter as calculated, at said desired timing, and the count value of said sound processing counter at said desired timing will become smaller, by way of performing said synchronization processing.

11. The mobile phone terminal according to claim 9, wherein said synchronization controller intermittently performs said transmission time calculating processing and the synchronization processing.

12. The mobile phone terminal according to claim 9, wherein said synchronization controller transmits a moving picture processing start signal, commanding the start of said moving picture processing, through said sound processing controller to said moving picture processing block, and transmits a moving picture processing start command signal, commanding the start of said sound processing, to said sound processing controller, at a timing when the transmission time as calculated by said transmission time calculating processing has elapsed, as from the transmission of said moving picture processing start signal, by way of performing said synchronization processing.

13. The mobile phone terminal according to claim 9, further comprising said moving picture processing block.

14. The mobile phone terminal according to claim 13, wherein said moving picture processing block further includes a moving picture processing signal output unit for sending out an output of said moving picture processing unit to outside, said moving picture processing signal output unit being connected wirelessly or over a cable to an outside moving picture outputting device.

15. The mobile phone terminal according to claim 9, wherein said moving picture processing block is contained in an external moving picture processing terminal and wherein said sound processing controller is connected wirelessly or over a cable to said moving picture processing block.

16. The mobile phone terminal according to claim 9, wherein
said moving picture processing block is contained in an external moving picture processing terminal connectable via a mobile phone system to a plural number of said moving picture processing controllers; and wherein
said synchronization controller controls said sound processing controller through said sound processing controller for synchronizing said sound processing with said moving picture processing.

17. A synchronization controlling method carried out by a mobile phone terminal configured for performing sound processing using a sound processing block including a sound processor unit for processing the sound information expressing sound and a sound processing controller controlling the sound processing by said sound processor unit, said mobile phone terminal including a moving picture processing unit for processing the moving picture information expressing moving picture and a moving picture processing controller for controlling the moving picture processing by said moving picture processing unit, said synchronization controlling method comprising:
a transmission time calculating step of calculating the transmission time of a signal transmitted between said sound processing block and said moving picture processing controller; and
a synchronization controlling step of compensating the synchronization error between said moving picture processing and said sound processing, based on the signal transmission time calculated in said transmission time calculating step for performing synchronization processing for synchronizing the moving picture processing by said moving picture processing unit with the sound processing by said sound processor unit.

18. The synchronization controlling method for a mobile phone terminal according to claim 17, wherein
the mobile phone terminal further comprises a moving picture processing counter for indicating the state of progress of moving picture processing by said moving picture processing unit in terms of a count value; wherein
said sound processing block further including a sound processing counter for indicating the state of progress of the sound processing by said sound processor unit in terms of a count value; and wherein
said synchronization controlling step includes as said synchronization processing the steps of:
acquiring a count value of said sound processing counter via said moving picture processing controller;
calculating a count value of said sound processing counter at a desired timing, based on a count value of said sound processing counter acquired, a count value of said moving picture processing counter at the time of acquisition of the count value of said sound processing counter, a count value of said moving picture processing counter at said desired timing and on the transmission time as calculated by said transmission time calculating processing; and
controlling the processing speed in said moving picture processing unit through said moving picture processing controller so that the difference between the count value of said sound processing counter at said desired timing and the count value of said moving picture processing counter at said desired timing will become smaller, by way of performing said synchronization processing.

19. The synchronization controlling method for a mobile phone terminal according to claim 17, wherein
said transmission time calculating step and the synchronization controlling step are carried out intermittently.

20. The synchronization controlling method for a mobile phone terminal according to claim 17, wherein
said synchronization controlling step includes as said synchronization processing the steps of:
transmitting a sound processing start signal, commanding the start of said sound processing, through said moving picture processing controller to said sound processing block; and
transmitting a moving picture processing start command signal, commanding the start of said moving picture processing, to said moving picture processing controller, at a timing when the transmission time as calculated by said transmission time calculating step has elapsed, as from the time of transmitting said sound processing start signal, by way of performing said synchronization processing.

21. A synchronization controlling method carried out by a mobile phone terminal configured for performing moving picture processing using a moving picture processing block including a moving picture processing unit for processing the moving picture information expressing moving picture and a moving picture processing controller controlling the moving picture processing by said moving picture processing unit, said mobile phone terminal including a sound processor unit for processing the sound information expressing sound and a sound processing controller for controlling the sound processing by said sound processor unit, said synchronization controlling method comprising:
a transmission time calculating step of calculating the transmission time of a signal transmitted between said moving picture processing block and said sound processing controller; and
a synchronization controlling step of compensating the synchronization error between said moving picture processing and said sound processing by said sound processor unit, based on the signal transmission time calculated in said transmission time calculating step, for performing synchronization processing for synchronizing the moving picture processing by said moving picture processing unit with the sound processing by said sound processor unit.

22. The synchronization controlling method for a mobile phone terminal according to claim 21, wherein
the mobile phone terminal further comprises a sound processing counter for indicating the state of progress of sound processing by said sound processor unit in terms of a count value; wherein
said moving picture processing block further includes a moving picture processing counter for indicating the state of progress of the moving picture processing by said moving picture processing unit in terms of a count value; and wherein
said synchronization controlling step includes as said synchronization processing the steps of:
acquiring a count value of said moving picture processing counter via said sound processing controller;
calculating a count value of said moving picture processing counter at a desired timing, based on a count value of said moving picture processing counter acquired, a count value of said sound processing counter at the time of acquisition of the count value of said moving picture processing counter, a count value of said sound processing counter at said desired timing and on the transmission time as calculated by said transmission time calculating step; and controlling the processing speed in said sound processor unit through said sound processing controller so that the difference between the count value of said moving picture processing counter at said desired timing and the count value of said sound processing counter at said desired timing will become smaller, by way of performing said synchronization processing.

23. The synchronization controlling method for a mobile phone terminal according to claim 21, wherein
said transmission time calculating step and the synchronization controlling step are carried out intermittently.

24. The synchronization controlling method for a mobile phone terminal according to claim 21, wherein
said synchronization controlling step includes as said synchronization processing the steps of:
transmitting a moving picture processing start signal, commanding the start of said moving picture processing, through said sound processing controller to said sound processing block; and
transmitting a sound processing start command signal, commanding the start of said sound processing, to said sound processing controller, at a timing when the transmission time as calculated by said transmission time calculating step as from the transmission of said moving picture processing start signal has elapsed, by way of performing said synchronization processing.

* * * * *